United States Patent
Caudy et al.

(10) Patent No.: US 11,263,211 B2
(45) Date of Patent: *Mar. 1, 2022

(54) DATA PARTITIONING AND ORDERING

(71) Applicant: Deephaven Data Labs LLC, Plymouth, MN (US)

(72) Inventors: Ryan Caudy, New York, NY (US); David R. Kent, IV, Colorado Springs, CO (US); Charles Wright, Cortlandt Manor, NY (US); Radu Teodorescu, New York, NY (US)

(73) Assignee: Deephaven Data Labs, LLC, Plymouth, MN (US)

( * ) Notice: Subject to any disclaimer, the term of this patent is extended or adjusted under 35 U.S.C. 154(b) by 350 days.

This patent is subject to a terminal disclaimer.

(21) Appl. No.: 16/398,586

(22) Filed: Apr. 30, 2019

(65) Prior Publication Data

US 2019/0258625 A1 Aug. 22, 2019

Related U.S. Application Data

(63) Continuation of application No. 15/154,974, filed on May 14, 2016, now Pat. No. 10,353,893.

(Continued)

(51) Int. Cl.
*G06F 16/00* (2019.01)
*G06F 16/2453* (2019.01)
(Continued)

(52) U.S. Cl.
CPC ........ *G06F 16/2453* (2019.01); *G06F 3/0481* (2013.01); *G06F 3/0482* (2013.01);
(Continued)

(58) Field of Classification Search
CPC ............ G06F 11/1451; G06F 11/1464; G06F 11/1469; G06F 12/0261; G06F 12/084; G06F 12/1483; G06F 15/17331; G06F 16/113; G06F 16/144; G06F 16/162; G06F 16/215; G06F 16/22; G06F 16/221; G06F 16/2228; G06F 16/2237; G06F 16/2246;
(Continued)

(56) References Cited

U.S. PATENT DOCUMENTS 5,335,202 A 8/1994 Manning et al.
5,452,434 A 9/1995 Macdonald
(Continued)

FOREIGN PATENT DOCUMENTS

CA 2309462 A1 12/2000
EP 1406463 A2 4/2004
(Continued)

OTHER PUBLICATIONS

"About Entering Commands in the Command Window", dated Dec. 16, 2015. Retrieved from https://knowledge.autodesk.com/support/autocad/learn-explore/caas/CloudHelp/cloudhelp/2016/ENU/AutoCAD-Core/files/GUID-BB0C3E79-66AF-4557-9140-D31B4CF3C9CF-htm.html (last accessed Jun. 16, 2016).
(Continued)

*Primary Examiner* — Shiow-Jy Fan
(74) *Attorney, Agent, or Firm* — Carmichael IP, PLLC

(57) ABSTRACT

Described are methods, systems and computer readable media for data partitioning and ordering.

6 Claims, 12 Drawing Sheets

Related U.S. Application Data

(60) Provisional application No. 62/161,813, filed on May 14, 2015.

(51) Int. Cl.

| | |
|---|---|
| G06F 16/23 | (2019.01) |
| G06F 16/22 | (2019.01) |
| G06F 16/27 | (2019.01) |
| G06F 16/16 | (2019.01) |
| G06F 16/215 | (2019.01) |
| G06F 16/245 | (2019.01) |
| G06F 16/248 | (2019.01) |
| G06F 16/25 | (2019.01) |
| G06F 16/28 | (2019.01) |
| G06F 16/907 | (2019.01) |
| G06F 16/951 | (2019.01) |
| G06F 16/242 | (2019.01) |
| G06F 16/2455 | (2019.01) |
| G06F 16/2457 | (2019.01) |
| G06F 16/901 | (2019.01) |
| G06F 16/9535 | (2019.01) |
| G06F 16/955 | (2019.01) |
| G06F 16/957 | (2019.01) |
| G06F 21/00 | (2013.01) |
| G06F 21/62 | (2013.01) |
| G06F 40/18 | (2020.01) |
| G06F 40/134 | (2020.01) |
| G06F 40/166 | (2020.01) |
| G06F 40/177 | (2020.01) |
| G06F 40/216 | (2020.01) |
| G06F 40/274 | (2020.01) |
| G06F 40/117 | (2020.01) |
| G06F 40/183 | (2020.01) |
| G06F 40/174 | (2020.01) |
| G06F 3/0482 | (2013.01) |
| G06F 3/04895 | (2022.01) |
| G06F 12/084 | (2016.01) |
| H04L 51/00 | (2022.01) |
| G06F 15/173 | (2006.01) |
| G06F 3/0481 | (2022.01) |
| G06F 3/04847 | (2022.01) |
| G06F 3/0485 | (2022.01) |
| G06F 12/02 | (2006.01) |
| G06F 8/30 | (2018.01) |
| G06F 8/41 | (2018.01) |
| H04L 67/1001 | (2022.01) |
| G06F 3/06 | (2006.01) |
| G06F 11/14 | (2006.01) |
| H04L 67/01 | (2022.01) |
| G06F 8/60 | (2018.01) |
| H04L 67/00 | (2022.01) |
| H04L 12/18 | (2006.01) |
| H04L 61/5069 | (2022.01) |
| H04L 69/16 | (2022.01) |
| H04L 29/06 | (2006.01) |
| H04L 67/56 | (2022.01) |
| H04L 67/566 | (2022.01) |
| H04L 67/568 | (2022.01) |
| G06F 12/14 | (2006.01) |
| H04L 51/046 | (2022.01) |
| G06F 3/0483 | (2013.01) |
| H04L 67/141 | (2022.01) |
| G06F 16/14 | (2019.01) |
| G06F 16/11 | (2019.01) |
| G06F 17/40 | (2006.01) |
| G06Q 40/04 | (2012.01) |
| H04L 67/5681 | (2022.01) |

(52) U.S. Cl.
CPC .......... *G06F 3/0483* (2013.01); *G06F 3/0485* (2013.01); *G06F 3/04847* (2013.01); *G06F 3/04895* (2013.01); *G06F 3/0605* (2013.01); *G06F 3/067* (2013.01); *G06F 3/0656* (2013.01); *G06F 8/30* (2013.01); *G06F 8/41* (2013.01); *G06F 8/427* (2013.01); *G06F 8/60* (2013.01); *G06F 11/1451* (2013.01); *G06F 11/1464* (2013.01); *G06F 11/1469* (2013.01); *G06F 12/0261* (2013.01); *G06F 12/084* (2013.01); *G06F 12/1483* (2013.01); *G06F 15/17331* (2013.01); *G06F 16/113* (2019.01); *G06F 16/144* (2019.01); *G06F 16/162* (2019.01); *G06F 16/215* (2019.01); *G06F 16/22* (2019.01); *G06F 16/221* (2019.01); *G06F 16/2228* (2019.01); *G06F 16/2237* (2019.01); *G06F 16/2246* (2019.01); *G06F 16/2255* (2019.01); *G06F 16/2264* (2019.01); *G06F 16/2272* (2019.01); *G06F 16/2282* (2019.01); *G06F 16/23* (2019.01); *G06F 16/2308* (2019.01); *G06F 16/2358* (2019.01); *G06F 16/2365* (2019.01); *G06F 16/2372* (2019.01); *G06F 16/2379* (2019.01); *G06F 16/242* (2019.01); *G06F 16/245* (2019.01); *G06F 16/248* (2019.01); *G06F 16/2428* (2019.01); *G06F 16/2455* (2019.01); *G06F 16/2456* (2019.01); *G06F 16/2457* (2019.01); *G06F 16/24534* (2019.01); *G06F 16/24535* (2019.01); *G06F 16/24537* (2019.01); *G06F 16/24539* (2019.01); *G06F 16/24553* (2019.01); *G06F 16/24561* (2019.01); *G06F 16/24575* (2019.01); *G06F 16/254* (2019.01); *G06F 16/27* (2019.01); *G06F 16/278* (2019.01); *G06F 16/285* (2019.01); *G06F 16/907* (2019.01); *G06F 16/9024* (2019.01); *G06F 16/951* (2019.01); *G06F 16/9535* (2019.01); *G06F 16/9566* (2019.01); *G06F 16/9574* (2019.01); *G06F 21/00* (2013.01); *G06F 21/6209* (2013.01); *G06F 40/117* (2020.01); *G06F 40/134* (2020.01); *G06F 40/166* (2020.01); *G06F 40/174* (2020.01); *G06F 40/177* (2020.01); *G06F 40/18* (2020.01); *G06F 40/183* (2020.01); *G06F 40/216* (2020.01); *G06F 40/274* (2020.01); *H04L 12/18* (2013.01); *H04L 51/046* (2013.01); *H04L 51/12* (2013.01); *H04L 61/2069* (2013.01); *H04L 63/101* (2013.01); *H04L 63/102* (2013.01); *H04L 67/1002* (2013.01); *H04L 67/141* (2013.01); *H04L 67/28* (2013.01); *H04L 67/2833* (2013.01); *H04L 67/2842* (2013.01); *H04L 67/34* (2013.01); *H04L 67/42* (2013.01); *H04L 69/16* (2013.01); *G06F 16/2291* (2019.01); *G06F 17/40* (2013.01); *G06F 2201/805* (2013.01); *G06F 2201/84* (2013.01); *G06F 2212/1052* (2013.01); *G06F 2212/154* (2013.01); *G06F 2212/163* (2013.01); *G06F 2212/60* (2013.01); *G06Q 40/04* (2013.01); *H04L 67/2847* (2013.01)

(58) Field of Classification Search
CPC ............. G06F 16/2255; G06F 16/2264; G06F 16/2272; G06F 16/2282; G06F 16/2291; G06F 16/23; G06F 16/2308; G06F 16/2358; G06F 16/2365; G06F 16/2372; G06F 16/2379; G06F 16/242; G06F 16/2428; G06F 16/245; G06F 16/2453; G06F 16/24534; G06F 16/24535; G06F 16/24537; G06F 16/24539; G06F 16/2455; G06F 16/24553; G06F 16/2456; G06F 16/24561; G06F 16/2457; G06F 16/24575; G06F 16/248; G06F 16/254; G06F 16/27; G06F 16/278; G06F 16/285; G06F 16/9024; G06F 16/907; G06F 16/951; G06F 16/9535; G06F 16/9566; G06F 16/9574; G06F 17/40; G06F 21/00; G06F 21/6209; G06F 2201/805; G06F 2201/84; G06F 2212/1052; G06F 2212/154; G06F 2212/163; G06F 2212/60; G06F 3/0481; G06F 3/0482; G06F 3/0483; G06F 3/04847; G06F 3/0485; G06F 3/04895; G06F 3/0605; G06F 3/0656; G06F 3/067; G06F 40/117; G06F 40/174; G06F 40/183; G06F 8/30; G06F 8/41; G06F 8/427; G06F 8/60; G06F 40/134; G06F 40/166; G06F 40/177; G06F 40/18; G06F 40/216; G06F 40/274; G06Q 40/04; H04L 12/18; H04L 51/046; H04L 51/12; H04L 61/2069; H04L 63/101; H04L 63/102; H04L 67/1002; H04L 67/141; H04L 67/28; H04L 67/2833; H04L 67/2842; H04L 67/2847; H04L 67/34; H04L 67/42; H04L 69/16

See application file for complete search history.

(56) References Cited

U.S. PATENT DOCUMENTS

| | | | |
|---|---|---|---|
| 5,469,567 A | 11/1995 | Okada | |
| 5,504,885 A | 4/1996 | Alashqur | |
| 5,530,939 A | 6/1996 | Mansfield et al. | |
| 5,568,632 A | 10/1996 | Nelson | |
| 5,673,369 A | 9/1997 | Kim | |
| 5,701,461 A | 12/1997 | Dalal et al. | |
| 5,701,467 A | 12/1997 | Freeston | |
| 5,764,953 A | 6/1998 | Collins et al. | |
| 5,787,411 A | 7/1998 | Groff et al. | |
| 5,787,428 A | 7/1998 | Hart | |
| 5,806,059 A | 9/1998 | Tsuchida et al. | |
| 5,808,911 A | 9/1998 | Tucker et al. | |
| 5,859,972 A | 1/1999 | Subramaniam et al. | |
| 5,873,075 A | 2/1999 | Cochrane et al. | |
| 5,875,334 A | 2/1999 | Chow et al. | |
| 5,878,415 A | 3/1999 | Olds | |
| 5,890,167 A | 3/1999 | Bridge et al. | |
| 5,899,990 A | 5/1999 | Maritzen et al. | |
| 5,920,860 A | 7/1999 | Maheshwari et al. | |
| 5,943,672 A | 8/1999 | Yoshida | |
| 5,960,087 A | 9/1999 | Tribble et al. | |
| 5,991,810 A | 11/1999 | Shapiro et al. | |
| 5,999,918 A | 12/1999 | Williams et al. | |
| 6,006,220 A | 12/1999 | Haderle et al. | |
| 6,026,390 A | 2/2000 | Ross et al. | |
| 6,032,144 A | 2/2000 | Srivastava et al. | |
| 6,032,148 A | 2/2000 | Wilkes | |
| 6,038,563 A | 3/2000 | Bapat et al. | |
| 6,058,394 A | 5/2000 | Bakow et al. | |
| 6,061,684 A | 5/2000 | Glasser et al. | |
| 6,105,017 A * | 8/2000 | Kleewein | G06F 16/245 |
| 6,122,514 A | 9/2000 | Spaur et al. | |
| 6,138,112 A | 10/2000 | Slutz | |
| 6,160,548 A | 12/2000 | Lea et al. | |
| 6,253,195 B1 | 6/2001 | Hudis et al. | |
| 6,266,669 B1 | 7/2001 | Brodersen et al. | |
| 6,289,357 B1 | 9/2001 | Parker | |
| 6,292,803 B1 | 9/2001 | Richardson et al. | |
| 6,304,876 B1 | 10/2001 | Isip | |
| 6,317,728 B1 | 11/2001 | Kane | |
| 6,327,702 B1 | 12/2001 | Sauntry et al. | |
| 6,336,114 B1 | 1/2002 | Garrison | |
| 6,353,819 B1 | 3/2002 | Edwards et al. | |
| 6,367,068 B1 | 4/2002 | Vaidyanathan et al. | |
| 6,389,414 B1 | 5/2002 | Delo et al. | |
| 6,389,462 B1 | 5/2002 | Cohen et al. | |
| 6,397,206 B1 | 5/2002 | Hill et al. | |
| 6,438,537 B1 | 8/2002 | Netz et al. | |
| 6,446,069 B1 | 9/2002 | Yaung et al. | |
| 6,460,037 B1 | 10/2002 | Weiss et al. | |
| 6,473,750 B1 | 10/2002 | Petculescu et al. | |
| 6,487,552 B1 | 11/2002 | Lei et al. | |
| 6,496,833 B1 | 12/2002 | Goldberg et al. | |
| 6,505,189 B1 | 1/2003 | Au et al. | |
| 6,505,241 B2 | 1/2003 | Pitts | |
| 6,510,551 B1 | 1/2003 | Miller | |
| 6,519,604 B1 | 2/2003 | Acharya et al. | |
| 6,530,075 B1 | 3/2003 | Beadle et al. | |
| 6,538,651 B1 | 3/2003 | Hayman et al. | |
| 6,546,402 B1 | 4/2003 | Beyer et al. | |
| 6,553,375 B1 | 4/2003 | Huang et al. | |
| 6,584,474 B1 | 6/2003 | Pereira | |
| 6,604,104 B1 | 8/2003 | Smith | |
| 6,618,720 B1 | 9/2003 | Au et al. | |
| 6,631,374 B1 | 10/2003 | Klein et al. | |
| 6,640,234 B1 | 10/2003 | Coffen et al. | |
| 6,697,880 B1 | 2/2004 | Dougherty | |
| 6,701,415 B1 | 3/2004 | Hendren | |
| 6,714,962 B1 | 3/2004 | Helland et al. | |
| 6,725,243 B2 | 4/2004 | Snapp | |
| 6,732,100 B1 | 5/2004 | Brodersen et al. | |
| 6,745,332 B1 | 6/2004 | Wong et al. | |
| 6,748,374 B1 | 6/2004 | Madan et al. | |
| 6,748,455 B1 | 6/2004 | Hinson et al. | |
| 6,760,719 B1 | 7/2004 | Hanson et al. | |
| 6,775,660 B2 | 8/2004 | Lin et al. | |
| 6,785,668 B1 | 8/2004 | Polo et al. | |
| 6,795,851 B1 | 9/2004 | Noy | |
| 6,801,908 B1 | 10/2004 | Fuloria et al. | |
| 6,816,855 B2 | 11/2004 | Hartel et al. | |
| 6,820,082 B1 | 11/2004 | Cook et al. | |
| 6,829,620 B2 | 12/2004 | Michael et al. | |
| 6,832,229 B2 | 12/2004 | Reed | |
| 6,851,088 B1 | 2/2005 | Conner et al. | |
| 6,882,994 B2 | 4/2005 | Yoshimura et al. | |
| 6,925,472 B2 | 8/2005 | Kong | |
| 6,934,717 B1 | 8/2005 | James | |
| 6,947,928 B2 | 9/2005 | Dettinger et al. | |
| 6,983,291 B1 | 1/2006 | Cochrane et al. | |
| 6,985,895 B2 | 1/2006 | Witkowski et al. | |
| 6,985,899 B2 | 1/2006 | Chan et al. | |
| 6,985,904 B1 | 1/2006 | Kaluskar et al. | |
| 7,020,649 B2 | 3/2006 | Cochrane et al. | |
| 7,024,414 B2 | 4/2006 | Sah et al. | |
| 7,031,962 B2 | 4/2006 | Moses | |
| 7,047,484 B1 | 5/2006 | Becker et al. | |
| 7,058,657 B1 | 6/2006 | Berno | |
| 7,089,228 B2 | 8/2006 | Arnold et al. | |
| 7,089,245 B1 | 8/2006 | George et al. | |
| 7,096,216 B2 | 8/2006 | Anonsen | |
| 7,099,927 B2 | 8/2006 | Cudd et al. | |
| 7,103,608 B1 | 9/2006 | Ozbutun et al. | |
| 7,110,997 B1 | 9/2006 | Turkel et al. | |
| 7,127,462 B2 | 10/2006 | Hiraga et al. | |
| 7,146,357 B2 | 12/2006 | Suzuki et al. | |
| 7,149,742 B1 | 12/2006 | Eastham et al. | |
| 7,167,870 B2 | 1/2007 | Avvari et al. | |
| 7,171,469 B2 | 1/2007 | Ackaouy et al. | |
| 7,174,341 B2 | 2/2007 | Ghukasyan et al. | |
| 7,181,686 B1 | 2/2007 | Bahrs | |
| 7,188,105 B2 | 3/2007 | Dettinger et al. | |
| 7,200,620 B2 | 4/2007 | Gupta | |
| 7,216,115 B1 | 5/2007 | Walters et al. | |
| 7,216,116 B1 | 5/2007 | Nilsson et al. | |

(56) References Cited

U.S. PATENT DOCUMENTS

| | | |
|---|---|---|
| 7,219,302 B1 * | 5/2007 | O'Shaughnessy .. G06F 3/04817 707/999.007 |
| 7,225,189 B1 | 5/2007 | McCormack et al. |
| 7,254,808 B2 | 8/2007 | Trappen et al. |
| 7,257,689 B1 | 8/2007 | Baird |
| 7,272,605 B1 | 9/2007 | Hinshaw et al. |
| 7,308,580 B2 | 12/2007 | Nelson et al. |
| 7,316,003 B1 | 1/2008 | Dulepet et al. |
| 7,330,969 B2 | 2/2008 | Harrison et al. |
| 7,333,941 B1 | 2/2008 | Choi |
| 7,343,585 B1 | 3/2008 | Lau et al. |
| 7,350,237 B2 | 3/2008 | Vogel et al. |
| 7,380,242 B2 | 5/2008 | Alaluf |
| 7,401,088 B2 | 7/2008 | Chintakayala et al. |
| 7,426,521 B2 | 9/2008 | Harter |
| 7,430,549 B2 | 9/2008 | Zane et al. |
| 7,433,863 B2 | 10/2008 | Zane et al. |
| 7,447,865 B2 | 11/2008 | Uppala et al. |
| 7,478,094 B2 | 1/2009 | Ho et al. |
| 7,484,096 B1 | 1/2009 | Garg et al. |
| 7,493,311 B1 | 2/2009 | Cutsinger et al. |
| 7,506,055 B2 | 3/2009 | McClain et al. |
| 7,523,462 B1 | 4/2009 | Nesamoney et al. |
| 7,529,734 B2 | 5/2009 | Dirisala |
| 7,529,750 B2 | 5/2009 | Bair |
| 7,542,958 B1 | 6/2009 | Warren et al. |
| 7,552,223 B1 | 6/2009 | Ackaouy et al. |
| 7,596,550 B2 | 9/2009 | Mordvinov et al. |
| 7,610,351 B1 | 10/2009 | Gollapudi et al. |
| 7,620,687 B2 | 11/2009 | Chen et al. |
| 7,624,126 B2 | 11/2009 | Pizzo et al. |
| 7,627,603 B2 | 12/2009 | Rosenblum et al. |
| 7,661,141 B2 | 2/2010 | Dutta et al. |
| 7,664,778 B2 | 2/2010 | Yagoub et al. |
| 7,672,275 B2 | 3/2010 | Yajnik et al. |
| 7,680,782 B2 | 3/2010 | Chen et al. |
| 7,711,716 B2 | 5/2010 | Stonecipher |
| 7,711,740 B2 | 5/2010 | Minore et al. |
| 7,711,788 B2 | 5/2010 | Ran et al. |
| 7,747,640 B2 | 6/2010 | Dettinger et al. |
| 7,761,444 B2 | 7/2010 | Zhang et al. |
| 7,797,356 B2 | 9/2010 | Iyer et al. |
| 7,827,204 B2 | 11/2010 | Heinzel et al. |
| 7,827,403 B2 | 11/2010 | Wong et al. |
| 7,827,523 B2 | 11/2010 | Ahmed et al. |
| 7,882,121 B2 | 2/2011 | Bruno et al. |
| 7,882,132 B2 | 2/2011 | Ghatare |
| 7,895,191 B2 | 2/2011 | Colossi et al. |
| 7,904,487 B2 | 3/2011 | Ghatare |
| 7,908,259 B2 | 3/2011 | Branscome et al. |
| 7,908,266 B2 | 3/2011 | Zeringue et al. |
| 7,930,412 B2 | 4/2011 | Yeap et al. |
| 7,966,311 B2 | 6/2011 | Haase |
| 7,966,312 B2 | 6/2011 | Nolan et al. |
| 7,966,343 B2 | 6/2011 | Yang et al. |
| 7,970,777 B2 | 6/2011 | Saxena et al. |
| 7,979,431 B2 | 7/2011 | Qazi et al. |
| 7,984,043 B1 | 7/2011 | Waas |
| 8,019,795 B2 | 9/2011 | Anderson et al. |
| 8,027,293 B2 | 9/2011 | Spaur et al. |
| 8,032,525 B2 | 10/2011 | Bowers et al. |
| 8,037,542 B2 | 10/2011 | Taylor et al. |
| 8,046,394 B1 | 10/2011 | Shatdal |
| 8,046,749 B1 | 10/2011 | Owen et al. |
| 8,055,672 B2 | 11/2011 | Djugash et al. |
| 8,060,484 B2 | 11/2011 | Bandera et al. |
| 8,171,018 B2 | 5/2012 | Zane et al. |
| 8,180,623 B2 | 5/2012 | Lendermann et al. |
| 8,180,789 B1 | 5/2012 | Wasserman et al. |
| 8,196,121 B2 | 6/2012 | Peshansky et al. |
| 8,209,356 B1 | 6/2012 | Roesler |
| 8,286,189 B2 | 10/2012 | Kukreja et al. |
| 8,321,833 B2 | 11/2012 | Langworthy et al. |
| 8,332,435 B2 | 12/2012 | Ballard et al. |
| 8,359,305 B1 | 1/2013 | Burke et al. |
| 8,375,127 B1 | 2/2013 | Lita |
| 8,380,757 B1 | 2/2013 | Bailey et al. |
| 8,418,142 B2 | 4/2013 | Ao et al. |
| 8,433,701 B2 | 4/2013 | Sargeant et al. |
| 8,458,218 B2 | 6/2013 | Wildermuth |
| 8,473,897 B2 | 6/2013 | Box et al. |
| 8,478,713 B2 | 7/2013 | Cotner et al. |
| 8,515,942 B2 | 8/2013 | Marum et al. |
| 8,543,620 B2 | 9/2013 | Ching |
| 8,553,028 B1 | 10/2013 | Urbach |
| 8,555,263 B2 | 10/2013 | Allen et al. |
| 8,560,502 B2 | 10/2013 | Vora |
| 8,595,151 B2 | 11/2013 | Hao et al. |
| 8,601,016 B2 | 12/2013 | Briggs et al. |
| 8,621,424 B2 | 12/2013 | Kejariwal et al. |
| 8,631,034 B1 | 1/2014 | Peloski |
| 8,635,251 B1 | 1/2014 | Chan |
| 8,650,182 B2 | 2/2014 | Murthy |
| 8,660,869 B2 | 2/2014 | Macintyre et al. |
| 8,676,863 B1 | 3/2014 | Connell et al. |
| 8,683,488 B2 | 3/2014 | Kukreja et al. |
| 8,713,518 B2 | 4/2014 | Pointer et al. |
| 8,719,252 B2 | 5/2014 | Miranker et al. |
| 8,725,707 B2 | 5/2014 | Chen et al. |
| 8,726,254 B2 | 5/2014 | Rohde et al. |
| 8,745,014 B2 | 6/2014 | Travis |
| 8,745,510 B2 | 6/2014 | D'Alo' et al. |
| 8,751,823 B2 | 6/2014 | Myles et al. |
| 8,768,961 B2 | 7/2014 | Krishnamurthy |
| 8,775,412 B2 | 7/2014 | Day et al. |
| 8,788,254 B2 | 7/2014 | Peloski |
| 8,793,243 B2 | 7/2014 | Weyerhaeuser et al. |
| 8,805,875 B1 | 8/2014 | Bawcom et al. |
| 8,805,947 B2 | 8/2014 | Kuzkin et al. |
| 8,806,133 B2 | 8/2014 | Hay et al. |
| 8,812,625 B1 | 8/2014 | Chitilian et al. |
| 8,838,656 B1 | 9/2014 | Cheriton |
| 8,855,999 B1 | 10/2014 | Elliot |
| 8,863,156 B1 | 10/2014 | Lepanto et al. |
| 8,874,512 B2 | 10/2014 | Jin et al. |
| 8,880,569 B2 | 11/2014 | Draper et al. |
| 8,880,787 B1 | 11/2014 | Kimmel et al. |
| 8,881,121 B2 | 11/2014 | Ali |
| 8,886,631 B2 | 11/2014 | Abadi et al. |
| 8,903,717 B2 | 12/2014 | Elliot |
| 8,903,842 B2 | 12/2014 | Bloesch et al. |
| 8,922,579 B2 | 12/2014 | Mi et al. |
| 8,924,384 B2 | 12/2014 | Driesen et al. |
| 8,930,892 B2 | 1/2015 | Pointer et al. |
| 8,954,418 B2 | 2/2015 | Faerber et al. |
| 8,959,495 B2 | 2/2015 | Chafi et al. |
| 8,996,864 B2 | 3/2015 | Maigne et al. |
| 9,002,876 B2 | 4/2015 | Gatter |
| 9,031,930 B2 | 5/2015 | Valentin |
| 9,077,611 B2 | 7/2015 | Cordray et al. |
| 9,122,765 B1 | 9/2015 | Chen |
| 9,177,079 B1 | 11/2015 | Ramachandran et al. |
| 9,195,712 B2 | 11/2015 | Freedman et al. |
| 9,298,768 B2 | 3/2016 | Varakin et al. |
| 9,311,357 B2 | 4/2016 | Ramesh et al. |
| 9,372,671 B2 | 6/2016 | Balan et al. |
| 9,384,184 B2 | 7/2016 | Acuña et al. |
| 9,477,702 B1 | 10/2016 | Ramachandran et al. |
| 9,612,959 B2 | 4/2017 | Caudy et al. |
| 9,613,018 B2 | 4/2017 | Zeldis et al. |
| 9,613,109 B2 | 4/2017 | Wright et al. |
| 9,619,210 B2 | 4/2017 | Kent et al. |
| 9,633,060 B2 | 4/2017 | Caudy et al. |
| 9,639,570 B2 | 5/2017 | Wright et al. |
| 9,672,238 B2 | 6/2017 | Wright et al. |
| 9,679,006 B2 | 6/2017 | Wright et al. |
| 9,690,821 B2 | 6/2017 | Wright et al. |
| 9,710,511 B2 | 7/2017 | Wright et al. |
| 9,760,591 B2 | 9/2017 | Caudy et al. |
| 9,805,084 B2 | 10/2017 | Wright et al. |
| 9,832,068 B2 | 11/2017 | McSherry et al. |
| 9,836,494 B2 | 12/2017 | Caudy et al. |
| 9,836,495 B2 | 12/2017 | Wright |
| 9,847,917 B2 | 12/2017 | Varney et al. |

(56) References Cited

U.S. PATENT DOCUMENTS

| | | |
|---|---|---|
| 9,852,231 B1 | 12/2017 | Ravi et al. |
| 9,886,469 B2 | 2/2018 | Kent et al. |
| 9,898,496 B2 | 2/2018 | Caudy et al. |
| 9,934,266 B2 | 4/2018 | Wright et al. |
| 10,002,153 B2 | 6/2018 | Teodorescu et al. |
| 10,002,154 B1 | 6/2018 | Kent et al. |
| 10,002,155 B1 | 6/2018 | Caudy et al. |
| 10,003,673 B2 | 6/2018 | Caudy et al. |
| 10,019,138 B2 | 7/2018 | Zeldis et al. |
| 10,069,943 B2 | 9/2018 | Teodorescu et al. |
| 10,521,449 B1 | 12/2019 | Schwartz et al. |
| 2002/0002576 A1 | 1/2002 | Wollrath et al. |
| 2002/0007331 A1 | 1/2002 | Lo et al. |
| 2002/0054587 A1 | 5/2002 | Baker et al. |
| 2002/0065981 A1 | 5/2002 | Jenne et al. |
| 2002/0129168 A1 | 9/2002 | Kanai et al. |
| 2002/0156722 A1 | 10/2002 | Greenwood |
| 2003/0004952 A1 | 1/2003 | Nixon et al. |
| 2003/0004964 A1 | 1/2003 | Cameron et al. |
| 2003/0061216 A1 | 3/2003 | Moses |
| 2003/0074400 A1 | 4/2003 | Brooks et al. |
| 2003/0110416 A1 | 6/2003 | Morrison et al. |
| 2003/0115212 A1 | 6/2003 | Hornibrook et al. |
| 2003/0167261 A1 | 9/2003 | Grust et al. |
| 2003/0177139 A1 | 9/2003 | Cameron et al. |
| 2003/0182261 A1 | 9/2003 | Patterson |
| 2003/0187744 A1 | 10/2003 | Goodridge |
| 2003/0208484 A1 | 11/2003 | Chang et al. |
| 2003/0208505 A1 | 11/2003 | Mullins et al. |
| 2003/0233632 A1 | 12/2003 | Aigen et al. |
| 2004/0002961 A1 | 1/2004 | Dettinger et al. |
| 2004/0015566 A1 | 1/2004 | Anderson et al. |
| 2004/0076155 A1 | 4/2004 | Yajnik et al. |
| 2004/0090472 A1 | 5/2004 | Risch et al. |
| 2004/0111492 A1 | 6/2004 | Nakahara et al. |
| 2004/0148630 A1 | 7/2004 | Choi |
| 2004/0186813 A1 | 9/2004 | Tedesco et al. |
| 2004/0205048 A1 | 10/2004 | Pizzo et al. |
| 2004/0216150 A1 | 10/2004 | Scheifler et al. |
| 2004/0220923 A1 | 11/2004 | Nica |
| 2004/0254876 A1 | 12/2004 | Coval et al. |
| 2004/0267824 A1 | 12/2004 | Pizzo et al. |
| 2005/0015490 A1 | 1/2005 | Saare et al. |
| 2005/0060693 A1 | 3/2005 | Robison et al. |
| 2005/0097447 A1 | 5/2005 | Serra et al. |
| 2005/0102284 A1 | 5/2005 | Srinivasan et al. |
| 2005/0102636 A1 | 5/2005 | McKeon et al. |
| 2005/0131893 A1 | 6/2005 | Glan |
| 2005/0132384 A1 | 6/2005 | Morrison et al. |
| 2005/0138624 A1 | 6/2005 | Morrison et al. |
| 2005/0144189 A1 | 6/2005 | Edwards et al. |
| 2005/0165866 A1 | 7/2005 | Bohannon et al. |
| 2005/0198001 A1 | 9/2005 | Cunningham et al. |
| 2005/0228828 A1 | 10/2005 | Chandrasekar et al. |
| 2006/0059253 A1 | 3/2006 | Goodman et al. |
| 2006/0074901 A1 | 4/2006 | Pirahesh et al. |
| 2006/0085490 A1 | 4/2006 | Baron et al. |
| 2006/0100989 A1 | 5/2006 | Chinchwadkar et al. |
| 2006/0101019 A1 | 5/2006 | Nelson et al. |
| 2006/0116983 A1 | 6/2006 | Dettinger et al. |
| 2006/0116999 A1 | 6/2006 | Dettinger et al. |
| 2006/0123024 A1 | 6/2006 | Sathyanarayan et al. |
| 2006/0131383 A1 | 6/2006 | Battagin et al. |
| 2006/0136361 A1 | 6/2006 | Peri et al. |
| 2006/0136380 A1* | 6/2006 | Purcell ............... G06F 16/24553 |
| 2006/0173693 A1 | 8/2006 | Arazi et al. |
| 2006/0195460 A1 | 8/2006 | Nori et al. |
| 2006/0212847 A1 | 9/2006 | Tarditi et al. |
| 2006/0218123 A1 | 9/2006 | Chowdhuri et al. |
| 2006/0218200 A1 | 9/2006 | Factor et al. |
| 2006/0230016 A1 | 10/2006 | Cunningham et al. |
| 2006/0235786 A1 | 10/2006 | DiSalvo |
| 2006/0253311 A1 | 11/2006 | Yin et al. |
| 2006/0268712 A1 | 11/2006 | Deen et al. |
| 2006/0271510 A1 | 11/2006 | Harward et al. |
| 2006/0277162 A1 | 12/2006 | Smith |
| 2006/0277319 A1 | 12/2006 | Elien et al. |
| 2007/0011211 A1 | 1/2007 | Reeves et al. |
| 2007/0027884 A1 | 2/2007 | Heger et al. |
| 2007/0033518 A1 | 2/2007 | Kenna et al. |
| 2007/0073765 A1 | 3/2007 | Chen |
| 2007/0101252 A1 | 5/2007 | Chamberlain et al. |
| 2007/0113014 A1 | 5/2007 | Manolov et al. |
| 2007/0116287 A1* | 5/2007 | Rasizade ................. G06F 21/10 380/258 |
| 2007/0118619 A1 | 5/2007 | Schwesig et al. |
| 2007/0140480 A1 | 6/2007 | Yao |
| 2007/0169003 A1 | 7/2007 | Branda et al. |
| 2007/0198479 A1 | 8/2007 | Cai et al. |
| 2007/0256060 A1 | 11/2007 | Ryu et al. |
| 2007/0258508 A1 | 11/2007 | Werb et al. |
| 2007/0271280 A1 | 11/2007 | Chandasekaran |
| 2007/0294217 A1 | 12/2007 | Chen et al. |
| 2007/0294319 A1 | 12/2007 | Mankad et al. |
| 2007/0299822 A1 | 12/2007 | Jopp et al. |
| 2008/0022136 A1 | 1/2008 | Mattsson et al. |
| 2008/0033907 A1 | 2/2008 | Woehler et al. |
| 2008/0034084 A1 | 2/2008 | Pandya |
| 2008/0046804 A1 | 2/2008 | Rui et al. |
| 2008/0072150 A1 | 3/2008 | Chan et al. |
| 2008/0097748 A1 | 4/2008 | Haley et al. |
| 2008/0120283 A1 | 5/2008 | Liu et al. |
| 2008/0155565 A1 | 6/2008 | Poduri |
| 2008/0168135 A1 | 7/2008 | Redlich et al. |
| 2008/0172639 A1 | 7/2008 | Keysar et al. |
| 2008/0235238 A1 | 9/2008 | Jalobeanu et al. |
| 2008/0263179 A1 | 10/2008 | Buttner et al. |
| 2008/0276241 A1 | 11/2008 | Bajpai et al. |
| 2008/0319951 A1 | 12/2008 | Ueno et al. |
| 2009/0019029 A1 | 1/2009 | Tommaney et al. |
| 2009/0022095 A1 | 1/2009 | Spaur et al. |
| 2009/0024615 A1 | 1/2009 | Pedro et al. |
| 2009/0037391 A1 | 2/2009 | Agrawal et al. |
| 2009/0037500 A1 | 2/2009 | Kirshenbaum |
| 2009/0055370 A1 | 2/2009 | Dagum et al. |
| 2009/0083215 A1 | 3/2009 | Burger |
| 2009/0089312 A1 | 4/2009 | Chi et al. |
| 2009/0157723 A1 | 6/2009 | Peuter et al. |
| 2009/0248618 A1 | 10/2009 | Carlson et al. |
| 2009/0248902 A1 | 10/2009 | Blue |
| 2009/0254516 A1 | 10/2009 | Meiyyappan et al. |
| 2009/0271472 A1 | 10/2009 | Scheifler et al. |
| 2009/0300770 A1 | 12/2009 | Rowney et al. |
| 2009/0319058 A1 | 12/2009 | Rovaglio et al. |
| 2009/0319484 A1 | 12/2009 | Golbandi et al. |
| 2009/0327242 A1 | 12/2009 | Brown et al. |
| 2010/0023952 A1 | 1/2010 | Sandoval et al. |
| 2010/0036801 A1 | 2/2010 | Pirvali et al. |
| 2010/0042587 A1* | 2/2010 | Johnson ................. G06F 16/221 715/243 |
| 2010/0047760 A1 | 2/2010 | Best et al. |
| 2010/0049715 A1 | 2/2010 | Jacobsen et al. |
| 2010/0057835 A1 | 3/2010 | Little |
| 2010/0070721 A1 | 3/2010 | Pugh et al. |
| 2010/0088309 A1* | 4/2010 | Petculescu ............. G06F 16/221 707/714 |
| 2010/0114890 A1 | 5/2010 | Hagar et al. |
| 2010/0161555 A1 | 6/2010 | Nica et al. |
| 2010/0161565 A1* | 6/2010 | Lee ..................... G06F 11/2028 707/674 |
| 2010/0186082 A1 | 7/2010 | Ladki et al. |
| 2010/0199161 A1 | 8/2010 | Aureglia et al. |
| 2010/0205017 A1 | 8/2010 | Sichelman et al. |
| 2010/0205351 A1 | 8/2010 | Wiener et al. |
| 2010/0281005 A1 | 11/2010 | Carlin et al. |
| 2010/0281071 A1 | 11/2010 | Ben-Zvi et al. |
| 2010/0293334 A1 | 11/2010 | Xun et al. |
| 2011/0126110 A1 | 5/2011 | Vilke et al. |
| 2011/0126154 A1 | 5/2011 | Boehler et al. |
| 2011/0153603 A1 | 6/2011 | Adiba et al. |
| 2011/0161378 A1 | 6/2011 | Williamson |
| 2011/0167020 A1 | 7/2011 | Yang et al. |
| 2011/0178984 A1* | 7/2011 | Talius ..................... G06F 16/27 707/634 |

(56) References Cited

U.S. PATENT DOCUMENTS

| | | |
|---|---|---|
| 2011/0194563 A1 | 8/2011 | Shen et al. |
| 2011/0213775 A1* | 9/2011 | Franke ................ G06F 16/278 707/737 |
| 2011/0219020 A1 | 9/2011 | Oks et al. |
| 2011/0231389 A1 | 9/2011 | Suma et al. |
| 2011/0314019 A1 | 12/2011 | Peris |
| 2012/0005238 A1 | 1/2012 | Jebara et al. |
| 2012/0110030 A1 | 5/2012 | Pomponio |
| 2012/0144234 A1 | 6/2012 | Clark et al. |
| 2012/0159303 A1 | 6/2012 | Friedrich et al. |
| 2012/0191446 A1 | 7/2012 | Binsztok et al. |
| 2012/0191582 A1 | 7/2012 | Rance et al. |
| 2012/0192096 A1 | 7/2012 | Bowman et al. |
| 2012/0197868 A1 | 8/2012 | Fauser et al. |
| 2012/0209886 A1 | 8/2012 | Henderson |
| 2012/0215741 A1 | 8/2012 | Poole et al. |
| 2012/0221528 A1 | 8/2012 | Renkes |
| 2012/0246052 A1 | 9/2012 | Taylor et al. |
| 2012/0246094 A1 | 9/2012 | Hsu et al. |
| 2012/0254143 A1 | 10/2012 | Varma et al. |
| 2012/0259759 A1 | 10/2012 | Crist et al. |
| 2012/0296846 A1 | 11/2012 | Teeter |
| 2013/0041946 A1 | 2/2013 | Joel et al. |
| 2013/0080514 A1 | 3/2013 | Gupta et al. |
| 2013/0086107 A1 | 4/2013 | Genochio et al. |
| 2013/0166551 A1 | 6/2013 | Wong et al. |
| 2013/0166556 A1 | 6/2013 | Baeumges et al. |
| 2013/0173667 A1 | 7/2013 | Soderberg et al. |
| 2013/0179460 A1 | 7/2013 | Cervantes et al. |
| 2013/0185619 A1 | 7/2013 | Ludwig |
| 2013/0191370 A1 | 7/2013 | Chen et al. |
| 2013/0198232 A1 | 8/2013 | Shamgunov et al. |
| 2013/0226959 A1 | 8/2013 | Dittrich et al. |
| 2013/0246560 A1 | 9/2013 | Feng et al. |
| 2013/0263123 A1 | 10/2013 | Zhou et al. |
| 2013/0290243 A1 | 10/2013 | Hazel et al. |
| 2013/0304725 A1 | 11/2013 | Nee et al. |
| 2013/0304744 A1 | 11/2013 | McSherry et al. |
| 2013/0311352 A1 | 11/2013 | Kayanuma et al. |
| 2013/0311488 A1 | 11/2013 | Erdogan et al. |
| 2013/0318129 A1 | 11/2013 | Vingralek et al. |
| 2013/0332487 A1 | 12/2013 | Ramesh et al. |
| 2013/0346365 A1 | 12/2013 | Kan et al. |
| 2014/0019494 A1 | 1/2014 | Tang |
| 2014/0026121 A1 | 1/2014 | Jackson et al. |
| 2014/0040203 A1 | 2/2014 | Lu et al. |
| 2014/0046638 A1 | 2/2014 | Peloski |
| 2014/0059646 A1 | 2/2014 | Hannel et al. |
| 2014/0082470 A1 | 3/2014 | Trebas et al. |
| 2014/0082724 A1 | 3/2014 | Pearson et al. |
| 2014/0095365 A1 | 4/2014 | Potekhina et al. |
| 2014/0115037 A1 | 4/2014 | Liu et al. |
| 2014/0136521 A1 | 5/2014 | Pappas |
| 2014/0143123 A1 | 5/2014 | Banke et al. |
| 2014/0149947 A1 | 5/2014 | Blyumen |
| 2014/0149997 A1 | 5/2014 | Kukreja et al. |
| 2014/0156618 A1 | 6/2014 | Castellano |
| 2014/0156632 A1 | 6/2014 | Yu et al. |
| 2014/0173023 A1 | 6/2014 | Varney et al. |
| 2014/0181036 A1 | 6/2014 | Dhamankar et al. |
| 2014/0181081 A1 | 6/2014 | Veldhuizen |
| 2014/0188924 A1 | 7/2014 | Ma et al. |
| 2014/0195558 A1 | 7/2014 | Murthy et al. |
| 2014/0201194 A1 | 7/2014 | Reddy et al. |
| 2014/0215446 A1 | 7/2014 | Araya et al. |
| 2014/0222768 A1 | 8/2014 | Rambo et al. |
| 2014/0229506 A1 | 8/2014 | Lee |
| 2014/0229874 A1 | 8/2014 | Strauss |
| 2014/0244687 A1 | 8/2014 | Shmueli et al. |
| 2014/0279810 A1 | 9/2014 | Mann et al. |
| 2014/0280029 A1 | 9/2014 | Ding et al. |
| 2014/0280372 A1* | 9/2014 | Huras ................ G06F 16/278 707/803 |
| 2014/0280522 A1 | 9/2014 | Watte |
| 2014/0282227 A1 | 9/2014 | Nixon et al. |
| 2014/0282444 A1 | 9/2014 | Araya et al. |
| 2014/0282540 A1 | 9/2014 | Bonnet et al. |
| 2014/0289700 A1 | 9/2014 | Srinivasaraghavan et al. |
| 2014/0292765 A1 | 10/2014 | Maruyama et al. |
| 2014/0297611 A1 | 10/2014 | Abbour et al. |
| 2014/0317084 A1 | 10/2014 | Chaudhry et al. |
| 2014/0321280 A1 | 10/2014 | Evans |
| 2014/0324821 A1 | 10/2014 | Meiyyappan et al. |
| 2014/0330700 A1 | 11/2014 | Studnitzer et al. |
| 2014/0330807 A1 | 11/2014 | Weyerhaeuser et al. |
| 2014/0344186 A1 | 11/2014 | Nadler |
| 2014/0344391 A1 | 11/2014 | Varney et al. |
| 2014/0358892 A1 | 12/2014 | Nizami et al. |
| 2014/0359574 A1 | 12/2014 | Beckwith et al. |
| 2014/0369550 A1 | 12/2014 | Davis et al. |
| 2014/0372482 A1 | 12/2014 | Martin et al. |
| 2014/0380051 A1 | 12/2014 | Edward et al. |
| 2015/0019516 A1 | 1/2015 | Wein et al. |
| 2015/0026155 A1 | 1/2015 | Martin |
| 2015/0032789 A1 | 1/2015 | Nguyen et al. |
| 2015/0067640 A1 | 3/2015 | Booker et al. |
| 2015/0074066 A1 | 3/2015 | Li et al. |
| 2015/0082218 A1 | 3/2015 | Affoneh et al. |
| 2015/0088894 A1 | 3/2015 | Czarlinska et al. |
| 2015/0095381 A1 | 4/2015 | Chen et al. |
| 2015/0120261 A1 | 4/2015 | Giannacopoulos et al. |
| 2015/0127599 A1 | 5/2015 | Schiebeler |
| 2015/0154262 A1 | 6/2015 | Yang et al. |
| 2015/0172117 A1 | 6/2015 | Dolinsky et al. |
| 2015/0188778 A1 | 7/2015 | Asayag et al. |
| 2015/0205588 A1 | 7/2015 | Bates et al. |
| 2015/0205589 A1 | 7/2015 | Dally |
| 2015/0254298 A1 | 9/2015 | Bourbonnais et al. |
| 2015/0269199 A1 | 9/2015 | McHugh et al. |
| 2015/0304182 A1 | 10/2015 | Brodsky et al. |
| 2015/0310051 A1* | 10/2015 | An ................ G06F 16/951 707/738 |
| 2015/0317359 A1 | 11/2015 | Tran et al. |
| 2015/0356157 A1 | 12/2015 | Anderson et al. |
| 2016/0026383 A1 | 1/2016 | Lee et al. |
| 2016/0026442 A1 | 1/2016 | Chhaparia |
| 2016/0026684 A1 | 1/2016 | Mukherjee et al. |
| 2016/0065670 A1 | 3/2016 | Kimmel et al. |
| 2016/0085772 A1 | 3/2016 | Vermeulen et al. |
| 2016/0092599 A1 | 3/2016 | Barsness et al. |
| 2016/0103897 A1 | 4/2016 | Nysewander et al. |
| 2016/0125018 A1 | 5/2016 | Tomoda et al. |
| 2016/0147748 A1 | 5/2016 | Florendo et al. |
| 2016/0171070 A1 | 6/2016 | Hrle et al. |
| 2016/0179754 A1 | 6/2016 | Borza et al. |
| 2016/0253294 A1 | 9/2016 | Allen et al. |
| 2016/0316038 A1 | 10/2016 | Jolfaei |
| 2016/0335281 A1 | 11/2016 | Teodorescu et al. |
| 2016/0335304 A1 | 11/2016 | Teodorescu et al. |
| 2016/0335317 A1 | 11/2016 | Teodorescu et al. |
| 2016/0335323 A1 | 11/2016 | Teodorescu et al. |
| 2016/0335330 A1 | 11/2016 | Teodorescu et al. |
| 2016/0335361 A1 | 11/2016 | Teodorescu et al. |
| 2017/0032016 A1 | 2/2017 | Zinner et al. |
| 2017/0048774 A1 | 2/2017 | Cheng et al. |
| 2017/0161514 A1 | 6/2017 | Dettinger et al. |
| 2017/0177677 A1 | 6/2017 | Wright et al. |
| 2017/0185385 A1 | 6/2017 | Kent et al. |
| 2017/0192910 A1 | 7/2017 | Wright et al. |
| 2017/0206229 A1 | 7/2017 | Caudy et al. |
| 2017/0206256 A1 | 7/2017 | Tsirogiannis et al. |
| 2017/0235794 A1 | 8/2017 | Wright et al. |
| 2017/0235798 A1 | 8/2017 | Wright et al. |
| 2017/0249350 A1 | 8/2017 | Wright et al. |
| 2017/0270150 A1 | 9/2017 | Wright et al. |
| 2017/0316046 A1 | 11/2017 | Caudy et al. |
| 2017/0329740 A1 | 11/2017 | Crawford et al. |
| 2017/0357708 A1 | 12/2017 | Ramachandran et al. |
| 2017/0359415 A1 | 12/2017 | Venkatraman et al. |
| 2018/0004796 A1 | 1/2018 | Kent et al. |
| 2018/0011891 A1 | 1/2018 | Wright et al. |

(56) References Cited

U.S. PATENT DOCUMENTS

| | | |
|---|---|---|
| 2018/0052879 A1 | 2/2018 | Wright |
| 2018/0137175 A1 | 5/2018 | Teodorescu et al. |

FOREIGN PATENT DOCUMENTS

| | | |
|---|---|---|
| EP | 1198769 B1 | 6/2008 |
| EP | 2199961 A1 | 6/2010 |
| EP | 2423816 A1 | 2/2012 |
| EP | 2743839 A1 | 6/2014 |
| GB | 2397906 A | 8/2004 |
| RU | 2421798 | 6/2011 |
| WO | 2000000879 A2 | 1/2000 |
| WO | 2001079964 A2 | 10/2001 |
| WO | 2011120161 A1 | 10/2011 |
| WO | 2012136627 A1 | 10/2012 |
| WO | 2014026220 A1 | 2/2014 |
| WO | 2014143208 A1 | 9/2014 |
| WO | 2016183563 A1 | 11/2016 |

OTHER PUBLICATIONS

"Change Data Capture", Oracle Database Online Documentation 11g Release 1 (11.1), dated Apr. 5, 2016. Retreived from https://web.archive.org/web/20160405032625/http://docs.oracle.com/cd/B28359_01/server.111/b28313/cdc.htm.

"Chapter 24. Query access plans", Tuning Database Performance, DB2 Version 9.5 for Linux, UNIX, and Windows, pp. 301-462, dated Dec. 2010. Retreived from http://public.dhe.ibm.com/ps/products/db2/info/vr95/pdf/en_US/DB2PerfTuneTroubleshoot-db2d3e953.pdf.

"GNU Emacs Manual", dated Apr. 15, 2016, pp. 43-47. Retrieved from https://web.archive.org/web/20160415175915/http://www.gnu.org/software/emacs/manual/html_mono/emacs.html.

"Google Protocol RPC Library Overview", dated Apr. 27, 2016. Retrieved from https://cloud.google.com/appengine/docs/python/tools/protorpc/ (last accessed Jun. 16, 2016).

"IBM—What is HBase?", dated Sep. 6, 2015. Retrieved from https://web.archive.org/web/20150906022050/http://www-01.ibm.com/software/data/infosphere/hadoop/hbase/.

"IBM Informix TimeSeries data management", dated Jan. 18, 2016. Retrieved from https://web.archive.org/web/20160118072141/http://www-01.ibm.com/software/data/informix/timeseries/.

"IBM InfoSphere BigInsights 3.0.0—Importing data from and exporting data to DB2 by using Sqoop", dated Jan. 15, 2015. Retrieved from https://web.archive.org/web/20150115034058/http://www-01.ibm.com/support/knowledgecenter/SSPT3X_3.0.0/com.ibm.swg.im.infosphere.biginsights.import.doc/doc/data_warehouse_sqoop.html.

"Maximize Data Value with Very Large Database Management by SAP Sybase IQ", dated 2013. Retrieved from http://www.sap.com/bin/sapcom/en_us/downloadasset.2013-06-jun-11-11.maximize-data-value-with-very-large-database-management-by-sap-sybase-iq-pdf.html.

"Microsoft Azure—Managing Access Control Lists (ACLs) for Endpoints by using PowerShell", dated Nov. 12, 2014. Retrieved from https://web.archive.org/web/20150110170715/http://msdn.microsoft.com/en-us/library/azure/dn376543.aspx.

"Oracle Big Data Appliance—Perfect Balance Java API", dated Sep. 20, 2015. Retrieved from https://web.archive.org/web/20131220040005/http://docs.oracle.com/cd/E41604_01/doc.22/e41667/toc.htm.

"Oracle Big Data Appliance—X5-2", dated Sep. 6, 2015. Retrieved from https://web.archive.org/web/20150906185409/http://www.oracle.com/technetwork/database/bigdata-appliance/overview/bigdataappliance-datasheet-1883358.pdf.

"Oracle Big Data Appliance Software User's Guide", dated Feb. 2015. Retrieved from https://docs.oracle.com/cd/E55905_01/doc.40/e55814.pdf.

"SAP HANA Administration Guide", dated Mar. 29, 2016, pp. 290-294. Retrieved from https://web.archive.org/web/20160417053656/http://help.sap.com/hana/SAP_HANA_Administration_Guide_en.pdf.

"Sophia Database—Architecture", dated Jan. 18, 2016. Retrieved from https://web.archive.org/web/20160118052919/http://sphia.org/architecture.html.

"Tracking Data Changes", SQL Server 2008 R2, dated Sep. 22, 2015. Retreived from https://web.archive.org/web/20150922000614/https://technet.microsoft.com/en-us/library/bb933994(v=sql.105).aspx.

"Use Formula AutoComplete", dated 2010. Retrieved from https://support.office.com/en-us/article/Use-Formula-AutoComplete-c7c46fa6-3a94-4150-a2f7-34140c1ee4d9 (last accessed Jun. 16, 2016).

Adelfio et al. "Schema Extraction for Tabular Data on the Web", Proceedings of the VLDB Endowment, vol. 6, No. 6. Apr. 2013. Retrieved from http://www.cs.umd.edu/~hjs/pubs/spreadsheets-vldb13.pdf.

Advisory Action dated Apr. 19, 2017, in U.S. Appl. No. 15/154,999.
Advisory Action dated Apr. 20, 2017, in U.S. Appl. No. 15/154,980.
Advisory Action dated Apr. 6, 2017, in U.S. Appl. No. 15/154,995.
Advisory Action dated Dec. 21, 2017, in U.S. Appl. No. 15/154,984.
Advisory Action dated Mar. 31, 2017, in U.S. Appl. No. 15/154,996.
Advisory Action dated May 3, 2017, in U.S. Appl. No. 15/154,993.
Borror, Jefferey A. "Q for Mortals 2.0", dated Nov. 1, 2011. Retrieved from http://code.kx.com/wiki/JB:QforMortals2/contents.
Breitbart, Update Propagation Protocols For Replicated Databases, SIGMOD '99 Philadelphia PA, 1999, pp. 97-108.
Cheusheva, Svetlana. "How to change the row color based on a cell's value in Excel", dated Oct. 29, 2013. Retrieved from https://www.ablebits.com/office-addins-blog/2013/10/29/excel-change-row-background-color/ (last accessed Jun. 16, 2016).
Corrected Notice of Allowability dated Aug. 9, 2017, in U.S. Appl. No. 15/154,980.
Corrected Notice of Allowability dated Jul. 31, 2017, in U.S. Appl. No. 15/154,999.
Corrected Notice of Allowability dated Mar. 10, 2017, in U.S. Appl. No. 15/154,979.
Corrected Notice of Allowability dated Oct. 26, 2017, in U.S. Appl. No. 15/610,162.
Decision on Pre-Appeal Conference Request mailed Nov. 20, 2017, in U.S. Appl. No. 15/154,997.
Ex Parte Quayle Action mailed Aug. 8, 2016, in U.S. Appl. No. 15/154,999.
Final Office Action dated Apr. 10, 2017, in U.S. Appl. No. 15/155,006.
Final Office Action dated Aug. 10, 2018, in U.S. Appl. No. 15/796,230.
Final Office Action dated Aug. 2, 2018, in U.S. Appl. No. 15/154,996.
Final Office Action dated Aug. 28, 2018, in U.S. Appl. No. 15/813,119.
Final Office Action dated Dec. 19, 2016, in U.S. Appl. No. 15/154,995.
Final Office Action dated Dec. 29, 2017, in U.S. Appl. No. 15/154,974.
Final Office Action dated Feb. 24, 2017, in U.S. Appl. No. 15/154,993.
Final Office Action dated Jan. 27, 2017, in U.S. Appl. No. 15/154,980.
Final Office Action dated Jan. 31, 2017, in U.S. Appl. No. 15/154,996.
Final Office Action dated Jul. 27, 2017, in U.S. Appl. No. 15/154,993.
Final Office Action dated Jun. 18, 2018, in U.S. Appl. No. 15/155,005.
Final Office Action dated Jun. 23, 2017, in U.S. Appl. No. 15/154,997.
Final Office Action dated Mar. 1, 2017, in U.S. Appl. No. 15/154,975.
Final Office Action dated Mar. 13, 2017, in U.S. Appl. No. 15/155,012.
Final Office Action dated Mar. 31, 2017, in U.S. Appl. No. 15/155,005.
Final Office Action dated May 15, 2017, in U.S. Appl. No. 15/155,010.
Final Office Action dated May 18, 2018, in U.S. Appl. No. 15/654,461.
Non-final Office Action dated Dec. 13, 2017, in U.S. Appl. No. 15/608,963.
Non-final Office Action dated Dec. 28, 2017, in U.S. Appl. No. 15/154,996.
Non-final Office Action dated Dec. 28, 2017, in U.S. Appl. No. 15/796,230.
Non-final Office Action dated Feb. 12, 2018, in U.S. Appl. No. 15/466,836.
Non-final Office Action dated Feb. 15, 2018, in U.S. Appl. No. 15/813,112.
Non-final Office Action dated Feb. 28, 2018, in U.S. Appl. No. 15/813,119.

(56) References Cited

OTHER PUBLICATIONS

Non-final Office Action dated Feb. 8, 2017, in U.S. Appl. No. 15/154,997.
Non-final Office Action dated Jan. 4, 2018, in U.S. Appl. No. 15/583,777.
Non-final Office Action dated Jul. 27, 2017, in U.S. Appl. No. 15/154,995.
Non-final Office Action dated Jun. 29, 2018, in U.S. Appl. No. 15/154,974.
Non-final Office Action dated Jun. 8, 2018, in U.S. Appl. No. 15/452,574.
Non-final Office Action dated Mar. 2, 2017, in U.S. Appl. No. 15/154,984.
Non-final Office Action dated Mar. 20, 2018, in U.S. Appl. No. 15/155,006.
Non-final Office Action dated Nov. 15, 2017, in U.S. Appl. No. 15/654,461.
Non-final Office Action dated Nov. 17, 2016, in U.S. Appl. No. 15/154,999.
Non-final Office Action dated Nov. 21, 2017, in U.S. Appl. No. 15/155,005.
Non-final Office Action dated Nov. 30, 2017, in U.S. Appl. No. 15/155,012.
Non-final Office Action dated Oct. 13, 2016, in U.S. Appl. No. 15/155,009.
Non-final Office Action dated Oct. 27, 2016, in U.S. Appl. No. 15/155,006.
Non-final Office Action dated Oct. 5, 2017, in U.S. Appl. No. 15/428,145.
Non-final Office Action dated Oct. 7, 2016, in U.S. Appl. No. 15/154,998.
Non-final Office Action dated Sep. 1, 2016, in U.S. Appl. No. 15/154,979.
Non-final Office Action dated Sep. 1, 2016, in U.S. Appl. No. 15/155,011.
Non-final Office Action dated Sep. 1, 2016, in U.S. Appl. No. 15/155,012.
Non-final Office Action dated Sep. 14, 2016, in U.S. Appl. No. 15/154,984.
Non-final Office Action dated Sep. 16, 2016, in U.S. Appl. No. 15/154,988.
Non-final Office Action dated Sep. 22, 2016, in U.S. Appl. No. 15/154,987.
Non-final Office Action dated Sep. 26, 2016, in U.S. Appl. No. 15/155,005.
Non-final Office Action dated Sep. 29, 2016, in U.S. Appl. No. 15/154,990.
Non-final Office Action dated Sep. 8, 2016, in U.S. Appl. No. 15/154,975.
Non-final Office Action dated Sep. 9, 2016, in U.S. Appl. No. 15/154,996.
Non-final Office Action dated Sep. 9, 2016, in U.S. Appl. No. 15/155,010.
Notice of Allowance dated Apr. 30, 2018, in U.S. Appl. No. 15/155,012.
Notice of Allowance dated Dec. 19, 2016, in U.S. Appl. No. 15/155,001.
Notice of Allowance dated Dec. 22, 2016, in U.S. Appl. No. 15/155,011.
Notice of Allowance dated Dec. 7, 2016, in U.S. Appl. No. 15/154,985.
Notice of Allowance dated Feb. 1, 2017, in U.S. Appl. No. 15/154,988.
Notice of Allowance dated Feb. 12, 2018, in U.S. Appl. No. 15/813,142.
Notice of Allowance dated Feb. 14, 2017, in U.S. Appl. No. 15/154,979.
Notice of Allowance dated Feb. 26, 2018, in U.S. Appl. No. 15/428,145.
Notice of Allowance dated Feb. 28, 2017, in U.S. Appl. No. 15/154,990.
Notice of Allowance dated Jan. 30, 2017, in U.S. Appl. No. 15/154,987.
Notice of Allowance dated Jul. 11, 2018, in U.S. Appl. No. 15/154,995.
Notice of Allowance dated Jul. 28, 2017, in U.S. Appl. No. 15/155,009.
Notice of Allowance dated Jun. 19, 2017, in U.S. Appl. No. 15/154,980.
Notice of Allowance dated Jun. 20, 2017, in U.S. Appl. No. 15/154,975.
Notice of Allowance dated Mar. 1, 2018, in U.S. Appl. No. 15/464,314.
Notice of Allowance dated Mar. 2, 2017, in U.S. Appl. No. 15/154,998.
Notice of Allowance dated Mar. 31, 2017, in U.S. Appl. No. 15/154,998.
Notice of Allowance dated May 10, 2017, in U.S. Appl. No. 15/154,988.
Notice of Allowance dated May 4, 2018, in U.S. Appl. No. 15/897,547.
Notice of Allowance dated Nov. 17, 2016, in U.S. Appl. No. 15/154,991.
Notice of Allowance dated Nov. 17, 2017, in U.S. Appl. No. 15/154,993.
Notice of Allowance dated Nov. 21, 2016, in U.S. Appl. No. 15/154,983.
Notice of Allowance dated Nov. 8, 2016, in U.S. Appl. No. 15/155,007.
Notice of Allowance dated Oct. 11, 2016, in U.S. Appl. No. 15/155,007.
Notice of Allowance dated Oct. 21, 2016, in U.S. Appl. No. 15/154,999.
Notice of Allowance dated Oct. 6, 2017, in U.S. Appl. No. 15/610,162.
Notice of Allowance dated Sep. 11, 2018, in U.S. Appl. No. 15/608,963.
Palpanas, Themistoklis et al. "Incremental Maintenance for Non-Distributive Aggregate Functions", Proceedings of the 28th VLDB Conference, 2002. Retreived from http://www.vldb.org/conf/2002/S22P04.pdf.
PowerShell Team, Intellisense in Windows PowerShell ISE 3.0, dated Jun. 12, 2012, Windows PowerShell Blog, pp. 1-6 Retrieved: https://biogs.msdn.microsoft.com/powershell/2012/06/12/intellisense-in-windows-powershell-ise-3-0/.
Smith, Ian. "Guide to Using SQL: Computed and Automatic Columns." Rdb Jornal, dated Sep. 2008, retrieved Aug. 15, 2016, retrieved from the Internet <URL: http://www.oracle.com/technetwork/products/rdb/automatic-columns-132042.pdf>.
Sobell, Mark G. "A Practical Guide to Linux, Commands, Editors and Shell Programming." Third Edition, dated Sep. 14, 2012. Retrieved from: http://techbus.safaribooksonline.com/book/operating-systems-and-server-administration/linux/9780133085129.
Svetlana Cheusheve, Excel formulas for conditional formatting based on another cell AbleBits (2014), https://www.ablebits.com/office-addins-blog/2014/06/10/excel-conditional-formatting-formulas/comment-page-6/ (last visited Jan. 14, 2019).
Wes McKinney & PyData Development Team. "pandas: powerful Python data analysis toolkit, Release 0.16.1" Dated May 11, 2015. Retrieved from: http://pandas.pydata.org/pandas-docs/version/0.16.1/index.html.
Wes McKinney & PyData Development Team. "pandas: powerful Python data analysis toolkit, Release 0.18.1" Dated May 3, 2016. Retrieved from: http://pandas.pydata.org/pandas-docs/version/0.18.1/index.html.
Wu, Buwen et al. "Scalable SPARQL Querying using Path Partitioning", 31st IEEE International Conference on Data Engineering (ICDE 2015), Seoul, Korea, Apr. 13-17, 2015. Retrieved from http://imada.sdu.dk/~zhou/papers/icde2015.pdf.
Final Office Action dated May 4, 2017, in U.S. Appl. No. 15/155,009.
Final Office Action dated Oct. 1, 2018, in U.S. Appl. No. 15/154,993.
Gai, Lei et al. "An Efficient Summary Graph Driven Method for RDF Query Processing", dated Oct. 27, 2015. Retreived from http://arxiv.org/pdf/1510.07749.pdf.

(56) References Cited

OTHER PUBLICATIONS

Hartle, Thom, Conditional Formatting in Excel using CQG's RTD Bate Function (2011), http://news.cqg.com/blogs/exce/l2011/05/conditional-formatting-excel-using-cqgs-rtd-bate-function (last visited Apr. 3, 2019).

International Search Report and Written Opinion dated Aug. 18, 2016, in International Appln. No. PCT/US2016/032582 filed May 14, 2016.

International Search Report and Written Opinion dated Aug. 18, 2016, in International Appln. No. PCT/US2016/032584 filed May 14, 2016.

International Search Report and Written Opinion dated Aug. 18, 2016, in International Appln. No. PCT/US2016/032588 filed May 14, 2016.

International Search Report and Written Opinion dated Aug. 18, 2016, in International Appln. No. PCT/US2016/032593 filed May 14, 2016.

International Search Report and Written Opinion dated Aug. 18, 2016, in International Appln. No. PCT/US2016/032597 filed May 14, 2016.

International Search Report and Written Opinion dated Aug. 18, 2016, in International Appln. No. PCT/US2016/032599 filed May 14, 2016.

International Search Report and Written Opinion dated Aug. 18, 2016, in International Appln. No. PCT/US2016/032605 filed May 14, 2016.

International Search Report and Written Opinion dated Aug. 25, 2016, in International Appln. No. PCT/US2016/032590 filed May 14, 2016.

International Search Report and Written Opinion dated Aug. 25, 2016, in International Appln. No. PCT/US2016/032592 filed May 14, 2016.

International Search Report and Written Opinion dated Aug. 4, 2016, in International Appln. No. PCT/US2016/032581 filed May 14, 2016.

International Search Report and Written Opinion dated Jul. 28, 2016, in International Appln. No. PCT/US2016/032586 filed May 14, 2016.

International Search Report and Written Opinion dated Jul. 28, 2016, in International Appln. No. PCT/US2016/032587 filed May 14, 2016.

International Search Report and Written Opinion dated Jul. 28, 2016, in International Appln. No. PCT/US2016/032589 filed May 14, 2016.

International Search Report and Written Opinion dated Sep. 1, 2016, in International Appln. No. PCT/US2016/032596 filed May 14, 2016.

International Search Report and Written Opinion dated Sep. 1, 2016, in International Appln. No. PCT/US2016/032598 filed May 14, 2016.

International Search Report and Written Opinion dated Sep. 1, 2016, in International Appln. No. PCT/US2016/032601 filed May 14, 2016.

International Search Report and Written Opinion dated Sep. 1, 2016, in International Appln. No. PCT/US2016/032602 filed May 14, 2016.

International Search Report and Written Opinion dated Sep. 1, 2016, in International Appln. No. PCT/US2016/032607 filed May 14, 2016.

International Search Report and Written Opinion dated Sep. 15, 2016, in International Appln. No. PCT/US2016/032591 filed May 14, 2016.

International Search Report and Written Opinion dated Sep. 15, 2016, in International Appln. No. PCT/US2016/032594 filed May 14, 2016.

International Search Report and Written Opinion dated Sep. 15, 2016, in International Appln. No. PCT/US2016/032600 filed May 14, 2016.

International Search Report and Written Opinion dated Sep. 29, 2016, in International Appln. No. PCT/US2016/032595 filed May 14, 2016.

International Search Report and Written Opinion dated Sep. 29, 2016, in International Appln. No. PCT/US2016/032606 filed May 14, 2016.

International Search Report and Written Opinion dated Sep. 8, 2016, in International Appln. No. PCT/US2016/032603 filed May 14, 2016.

International Search Report and Written Opinion dated Sep. 8, 2016, in International Appln. No. PCT/US2016/032604 filed May 14, 2016.

Jellema, Lucas. "Implementing Cell Highlighting in JSF-based Rich Enterprise Apps (Part 1)", dated Nov. 2008. Retrieved from http://www.oracle.com/technetwork/articles/adf/jellema-adfcellhighlighting-087850.html (last accessed Jun. 16, 2016).

Kramer, The Combining DAG: A Technique for Parallel Data Flow Analysis, IEEE Transactions on Parallel and Distributed Systems, vol. 5, No. 8, Aug. 1994, pp. 805-813.

Lou, Yuan. "A Multi-Agent Decision Support System for Stock Trading", IEEE Network, Jan./Feb. 2002. Retreived from http://www.reading.ac.uk/AcaDepts/si/sisweb13/ais/papers/journal12-A%20multi-agent%20Framework.pdf.

Mallet, "Relational Database Support for Spatio-Temporal Data", Technical Report TR 04-21, Sep. 2004, University of Alberta, Department of Computing Science.

Maria Azbel, How to hide and group columns in Excel AbleBits (2014), https://www.ablebits.com/office-addins-blog/2014/08/06/excel-hide-columns/ (last visited Jan. 18, 2019).

Mariyappan, Balakrishnan. "10 Useful Linux Bash_Completion Complete Command Examples (Bash Command Line Completion on Steroids)", dated Dec. 2, 2013. Retrieved from http://www.thegeekstuff.com/2013/12/bash-completion-complete/ (last accessed Jun. 16, 2016).

Mark Dodge & Craig Stinson, Microsoft Excel 2010 inside out (2011).

Murray, Derek G. et al. "Naiad: a timely dataflow system." SOSP '13 Proceedings of the Twenty-Fourth ACM Symposium on Operating Systems Principles. pp. 439-455. Nov. 2013.

Non-final Office Action dated Apr. 12, 2018, in U.S. Appl. No. 15/154,997.

Non-final Office Action dated Apr. 19, 2017, in U.S. Appl. No. 15/154,974.

Non-final Office Action dated Apr. 23, 2018, in U.S. Appl. No. 15/813,127.

Non-final Office Action dated Apr. 5, 2018, in U.S. Appl. No. 15/154,984.

Non-final Office Action dated Aug. 10, 2018, in U.S. Appl. No. 16/004,578.

Non-final Office Action dated Aug. 12, 2016, in U.S. Appl. No. 15/155,001.

Non-final Office Action dated Aug. 14, 2017, in U.S. Appl. No. 15/464,314.

Non-final Office Action dated Aug. 16, 2016, in U.S. Appl. No. 15/154,993.

Non-final Office Action dated Aug. 19, 2016, in U.S. Appl. No. 15/154,991.

Non-final Office Action dated Aug. 25, 2016, in U.S. Appl. No. 15/154,980.

Non-final Office Action dated Aug. 26, 2016, in U.S. Appl. No. 15/154,995.

Non-final Office Action dated Aug. 8, 2016, in U.S. Appl. No. 15/154,983.

Non-final Office Action dated Aug. 8, 2016, in U.S. Appl. No. 15/154,985.

"Definition of Multicast" by Lexico powered by Oxford at https://www.lexico.com/en/definition/multicast, 2019, p. 1.

"What is a Key-Value Database?" at https://database.guide/what-is-a-key-value-database, Database Concepts, NOSQL, 2019 Database.guide, Jun. 21, 2016, pp. 1-7.

(56) References Cited

OTHER PUBLICATIONS

Posey, Brien, "How to Combine PowerShell Cmdlets", Jun. 14, 2013 Redmond the Independent Voice of the Microsoft Community (Year: 2013), pp. 1-10.

* cited by examiner

DATA PARTITIONING AND ORDERING

This application is a continuation of U.S. application Ser. No. 15/154,974, entitled "Data Partitioning and Ordering", and filed on May 14, 2016, which claims the benefit of U.S. Provisional Application No. 62/161,813, entitled "Computer Data System" and filed on May 14, 2015, which is incorporated herein by reference in its entirety.

Embodiments relate generally to computer data systems, and more particularly, to methods, systems and computer readable media for data partitioning and ordering.

Data sources within a computer data system may include static sources and dynamic sources. Data from these sources may be stored into one or more tables that may not preserve an ordering of the data when stored on a physical data storage. The tables may not be partitioned and/or grouped so as to maintain an order to the stored data. Thus, when data is retrieved from the tables and a need to order the data exists, there may additional computation cycles required to order the retrieved data. Also, a need may exist to provide an efficient method of data storage and retrieval for large data sets in computer data systems. Embodiments were conceived in light of the above mentioned needs, problems and/or limitations, among other things.

Some implementations can include a method for storing ordered data in a computer data system. The method can include receiving an electronic message containing one or more data items, and storing the received data items to a first set of one or more first partitions as first stored data in a first electronic data storage device. The method can also include remapping the data items stored in the first set of partitions to a second set of one or more second partitions in a second electronic data storage device, each of the second partitions having a respective grouping, and storing the remapped first stored data as second stored data in the second set of partitions in a second electronic data storage device according to the respective grouping.

The method can further include sorting each second partition of the second set of partitions according to a strict ordering to generate ordered second partitions, and storing the ordered second partitions in the second electronic data storage device so as to maintain the strict ordering. The method can also include organizing each ordered second partition into one or more groups having one or more grouping levels based on one or more column values, wherein the organizing includes generating grouping metadata associated with the respective ordered second partition.

The second partition of the second set of partitions corresponds to a directory in a file system. The first electronic data storage device and the second electronic data storage device can be different from each other. The second partitions are arranged according to an overall schema and the ordered partitions are arranged according to a partition schema associated with each respective ordered partition.

Some implementations can include a method for retrieving ordered data in a computer data system. The method can include receiving an electronic message including a computer data system query, and performing first processing of the computer data system query to identify one or more data objects within a set of partitions stored on an electronic data storage device, the one or more data objects identified as containing data responsive to the query. The method can also include generating an intermediate result data object based on the first processing, and performing second processing of the computer data system query to generate an ordered collection of index values corresponding to one or more data items from the identified data objects having data responsive to the query, wherein the ordered collection contains index values into one or more data objects maintained according to a strict ordering associated with the data objects. The method can further include generating a subsequent result data object based on the second processing, and providing a reference to the subsequent result data object containing the ordered collection as a query result, the subsequent result data object including references to data and corresponding index values for that data, wherein the subsequent result data object maintains the strict ordering associated with the data objects.

The intermediate result data object may include only locations and location keys of data responsive to the query. The subsequent result data object can include locations of data responsive to the query and one or more references to data responsive to the query. Accessing and movement of data is delayed until after the first processing of the computer data system query. The set of partitions can include a hierarchical arrangement of partitions.

Some implementations can include a method for computer data system data object schema modification. The method can include receiving a request to modify a schema associated with a data object, and retrieving schema information from metadata associated with the data object. The method can also include modifying only the schema information according to the received request, and storing the modified schema information in the metadata associated with the data object, wherein the data object is accessible according to the modified schema information.

The method can also include providing the modified schema from the metadata associated with the data object in response to a request for information about the data object. The request to modify the schema can include a request to add a column to the data object, and wherein the column can be added by schema modification without accessing any of the data in the data object. The request to modify the schema can include a request to remove a column from the data object, and wherein the column can be removed by schema modification without accessing any of the data in the data object.

The request to modify the schema can include a request to modify a data type of a column within a data object, and the modified schema information can include a modified data type for that column based on the request.

The request to modify the schema can include a request to add a formula column to the data object, wherein a definition of the formula column can reside in the schema information and the formula column may not contain stored data, and wherein when data is requested from the formula column, the computer data system can compute a response result to the request for data from the formula column based on one or more data columns referenced by the formula column and returns that result.

The request to modify the schema can include a request to add a formula column to the data object, wherein a definition of the formula column can reside in the schema information and only a portion of rows in the formula column contain stored data, and wherein when data is requested from the formula column, the computer data system can compute a response result to the request for data from the formula column based on stored data in the formula column for rows where data is present and, for rows where data is not present in the formula column, can compute a response result to the request for data from the formula column based on one or more data columns referenced by the formula column and returns that result.

DETAILED DESCRIPTION

Reference may be made herein to the Java programming language, Java classes, Java bytecode and the Java Virtual Machine (JVM) for purposes of illustrating example implementations. It will be appreciated that implementations can include other programming languages (e.g., groovy, Scala, R, Go, etc.), other programming language structures as an alternative to or in addition to Java classes (e.g., other language classes, objects, data structures, program units, code portions, script portions, etc.), other types of bytecode, object code and/or executable code, and/or other virtual machines or hardware implemented machines configured to execute a data system query.

Figure 1:
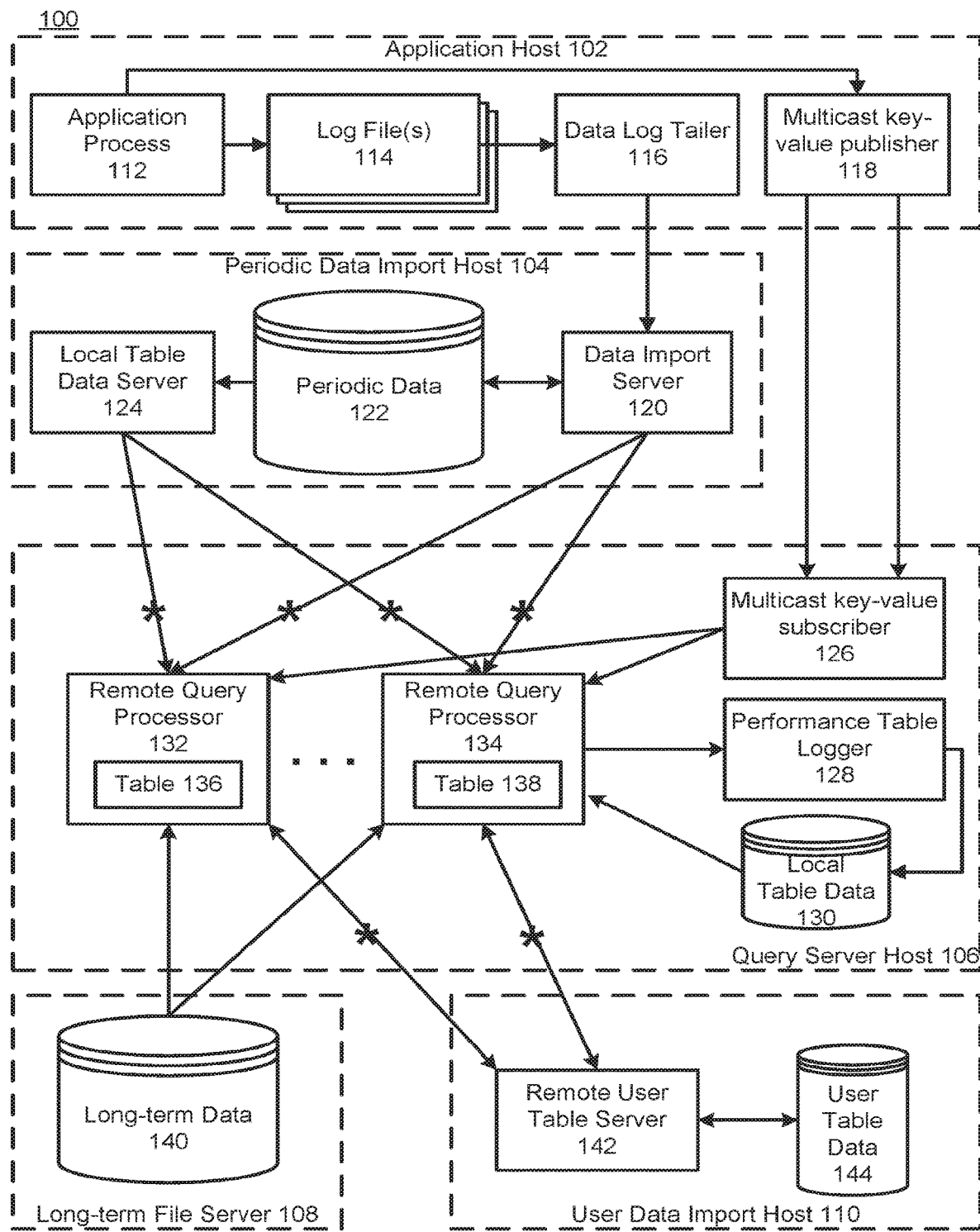
FIG. 1 is a diagram of an example computer data system showing an example data distribution configuration in accordance with some implementations.
Figure 2:
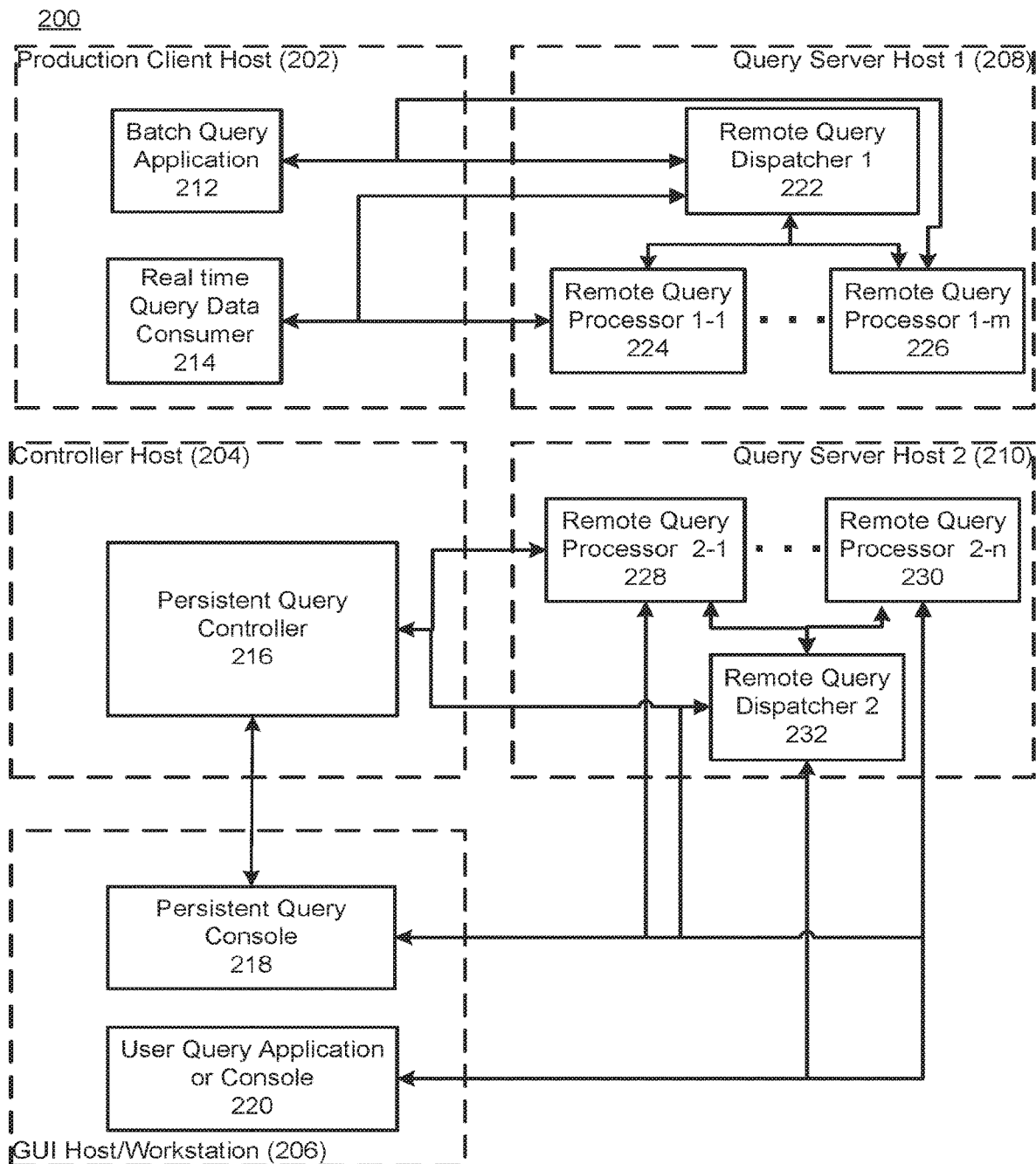
FIG. 2 is a diagram of an example computer data system showing an example administration/process control arrangement in accordance with some implementations.

FIG. 1 is a diagram of an example computer data system and network 100 showing an example data distribution configuration in accordance with some implementations. In particular, the system 100 includes an application host 102, a periodic data import host 104, a query server host 106, a long-term file server 108, and a user data import host 110. While tables are used as an example data object in the description below, it will be appreciated that the data system described herein can also process other data objects such as mathematical objects (e.g., a singular value decomposition of values in a given range of one or more rows and columns of a table), TableMap objects, etc. A TableMap object provides the ability to lookup a Table by some key. This key represents a unique value (or unique tuple of values) from the columns aggregated on in a byExternal( ) statement execution, for example. A TableMap object can be the result of a byExternal( ) statement executed as part of a query. It will also be appreciated that the configurations shown in FIGS. 1 and 2 are for illustration purposes and in a given implementation each data pool (or data store) may be directly attached or may be managed by a file server.

The application host 102 can include one or more application processes 112, one or more log files 114 (e.g., sequential, row-oriented log files), one or more data log tailers 116 and a multicast key-value publisher 118. The periodic data import host 104 can include a local table data server, direct or remote connection to a periodic table data store 122 (e.g., a column-oriented table data store) and a data import server 120. The query server host 106 can include a multicast key-value subscriber 126, a performance table logger 128, local table data store 130 and one or more remote query processors (132, 134) each accessing one or more respective tables (136, 138). The long-term file server 108 can include a long-term data store 140. The user data import host 110 can include a remote user table server 142 and a user table data store 144. Row-oriented log files and column-oriented table data stores are discussed herein for illustration purposes and are not intended to be limiting. It will be appreciated that log files and/or data stores may be configured in other ways. In general, any data stores discussed herein could be configured in a manner suitable for a contemplated implementation.

In operation, the input data application process 112 can be configured to receive input data from a source (e.g., a securities trading data source), apply schema-specified, generated code to format the logged data as it's being prepared for output to the log file 114 and store the received data in the sequential, row-oriented log file 114 via an optional data logging process. In some implementations, the data logging process can include a daemon, or background process task, that is configured to log raw input data received from the application process 112 to the sequential, row-oriented log files on disk and/or a shared memory queue (e.g., for sending data to the multicast publisher 118). Logging raw input data to log files can additionally serve to provide a backup copy of data that can be used in the event that downstream processing of the input data is halted or interrupted or otherwise becomes unreliable.

A data log tailer 116 can be configured to access the sequential, row-oriented log file(s) 114 to retrieve input data logged by the data logging process. In some implementations, the data log tailer 116 can be configured to perform strict byte reading and transmission (e.g., to the data import server 120). The data import server 120 can be configured to store the input data into one or more corresponding data stores such as the periodic table data store 122 in a column-oriented configuration. The periodic table data store 122 can be used to store data that is being received within a time period (e.g., a minute, an hour, a day, etc.) and which may be later processed and stored in a data store of the long-term file server 108. For example, the periodic table data store 122 can include a plurality of data servers configured to store periodic securities trading data according to one or more characteristics of the data (e.g., a data value such as security symbol, the data source such as a given trading exchange, etc.).

The data import server 120 can be configured to receive and store data into the periodic table data store 122 in such a way as to provide a consistent data presentation to other parts of the system. Providing/ensuring consistent data in this context can include, for example, recording logged data to a disk or memory, ensuring rows presented externally are available for consistent reading (e.g., to help ensure that if the system has part of a record, the system has all of the record without any errors), and preserving the order of records from a given data source. If data is presented to clients, such as a remote query processor (132, 134), then the data may be persisted in some fashion (e.g., written to disk).

The local table data server 124 can be configured to retrieve data stored in the periodic table data store 122 and provide the retrieved data to one or more remote query processors (132, 134) via an optional proxy.

The remote user table server (RUTS) 142 can include a centralized consistent data writer, as well as a data server that provides processors with consistent access to the data that it is responsible for managing. For example, users can provide input to the system by writing table data that is then consumed by query processors.

The remote query processors (132, 134) can use data from the data import server 120, local table data server 124 and/or from the long-term file server 108 to perform queries. The remote query processors (132, 134) can also receive data from the multicast key-value subscriber 126, which receives data from the multicast key-value publisher 118 in the application host 102. The performance table logger 128 can log performance information about each remote query processor and its respective queries into a local table data store 130. Further, the remote query processors can also read data from the RUTS, from local table data written by the performance logger, or from user table data read over NFS, for example.

It will be appreciated that the configuration shown in FIG. 1 is a typical example configuration that may be somewhat idealized for illustration purposes. An actual configuration may include one or more of each server and/or host type. The hosts/servers shown in FIG. 1 (e.g., 102-110, 120, 124 and 142) may each be separate or two or more servers may be combined into one or more combined server systems. Data stores can include local/remote, shared/isolated and/or redundant. Any table data may flow through optional proxies indicated by an asterisk on certain connections to the remote query processors. Also, it will be appreciated that the term "periodic" is being used for illustration purposes and can include, but is not limited to, data that has been received within a given time period (e.g., millisecond, second, minute, hour, day, week, month, year, etc.) and which has not yet been stored to a long-term data store (e.g., 140).

FIG. 2 is a diagram of an example computer data system 200 showing an example administration/process control arrangement in accordance with some implementations. The system 200 includes a production client host 202, a controller host 204, a GUI host or workstation 206, and query server hosts 208 and 210. It will be appreciated that there may be one or more of each of 202-210 in a given implementation.

The production client host 202 can include a batch query application 212 (e.g., a query that is executed from a command line interface or the like) and a real time query data consumer process 214 (e.g., an application that connects to and listens to tables created from the execution of a separate query). The batch query application 212 and the real time query data consumer 214 can connect to a remote query dispatcher 222 and one or more remote query processors (224, 226) within the query server host 1 208.

The controller host 204 can include a persistent query controller 216 configured to connect to a remote query dispatcher 232 and one or more remote query processors 228-230. In some implementations, the persistent query controller 216 can serve as the "primary client" for persistent queries and can request remote query processors from dispatchers, and send instructions to start persistent queries. For example, a user can submit a query to 216, and 216 starts and runs the query every day. In another example, a securities trading strategy could be a persistent query. The persistent query controller can start the trading strategy query every morning before the market opened, for instance. It will be appreciated that 216 can work on times other than days. In some implementations, the controller may require its own clients to request that queries be started, stopped, etc. This can be done manually, or by scheduled (e.g., cron) jobs. Some implementations can include "advanced scheduling" (e.g., auto-start/stop/restart, time-based repeat, etc.) within the controller.

The GUI/host workstation can include a user console 218 and a user query application 220. The user console 218 can be configured to connect to the persistent query controller 216. The user query application 220 can be configured to connect to one or more remote query dispatchers (e.g., 232) and one or more remote query processors (228, 230).

Figure 3:
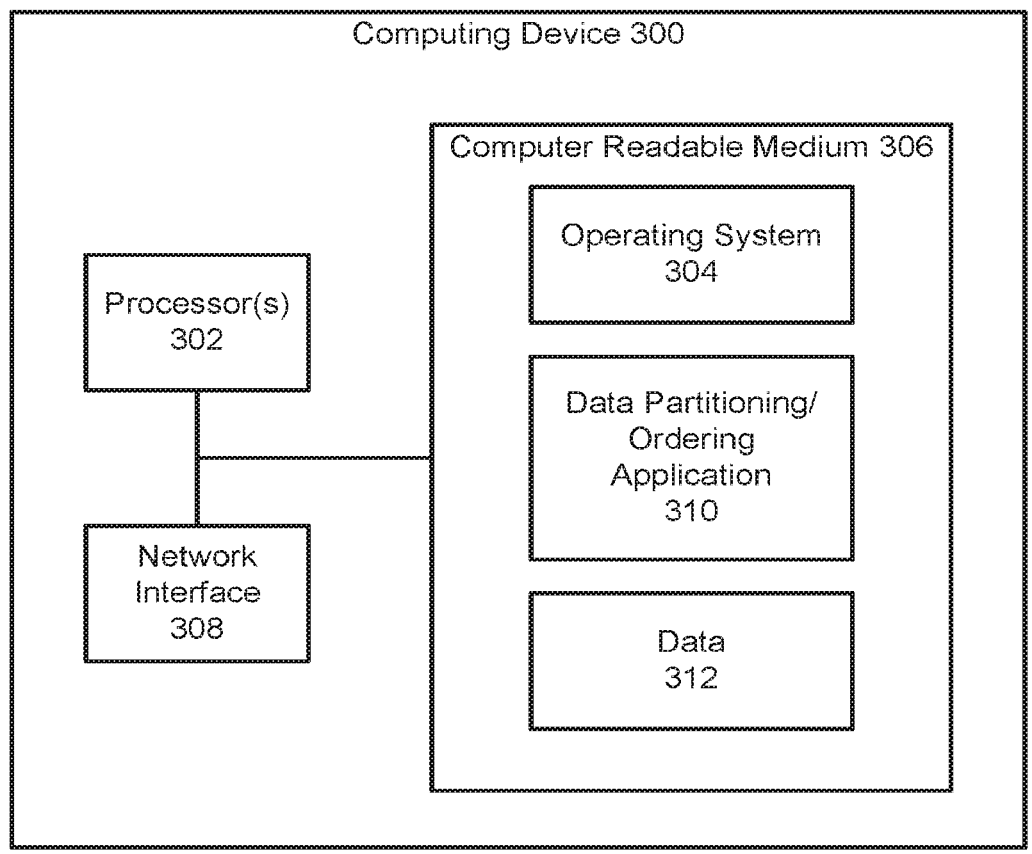
FIG. 3 is a diagram of an example computing device configured for data partitioning/ordering in accordance with some implementations.

FIG. 3 is a diagram of an example computing device 300 in accordance with at least one implementation. The computing device 300 includes one or more processors 302, operating system 304, computer readable medium 306 and network interface 308. The memory 306 can include a data storage/retrieval/schema modification application 310 and a data section 312 (e.g., for storing data objects, schema data, etc.).

In operation, the processor 302 may execute the application 310 stored in the memory 306. The application 310 can include software instructions that, when executed by the processor, cause the processor to perform operations for ordered data storage, retrieval and schema modification in accordance with the present disclosure (e.g., performing one or more of 802-812, 902-908, and/or 1002-1008 described below).

The application program 310 can operate in conjunction with the data section 312 and the operating system 304.

In general, some implementations can include a computer data system that stores and retrieves data (e.g., time series data) according to strict ordering rules. These rules ensure that data is stored in a strict order and that results of a query are evaluated and returned in the same order each time the query is executed. In some implementations, the computer data system may be configured to store and retrieve data according to a total ordering (e.g., an ordering across multiple dimensions). This can provide an advantage of optimizing the query code for query execution speed by permitting a user and query process (e.g., a remote query processor) to rely on an expected ordering and eliminate a need for performing an additional sorting operation on query results to achieve an expected or needed ordering for downstream operations. It also allows data to be ordered according to the source's data publication order without necessarily including data elements to refer to for query evaluation or result ordering purposes. It should be noted that updates from real-time or changing data, however, may not always be seen in the same order, since data is processed after asynchronous notifications and according to refresh cycles that progress at different speed and frequency in distinct remote query processors or client processes. Updates are not necessarily the results of a query, though. For some implementations order within a partition is always maintained.

For example, in the real-time (or periodic) case, a data system may store data in arrival order (which is typically time-series order) within the partition of the table that corresponds to a given data source. In the permanent-store case (or long term storage case), the computer data system starts with the real-time order and then re-partitions, optionally groups, and optionally sorts the real-time (or periodic) data according to one or more columns or formulas, otherwise respecting the retrieval order for the real-time data when producing the new stored data and its ordering.

Some implementations can include a partitioned data store that has partitions based, at least in part, on a file system and can include physical machine partitions, virtual machine partitions and/or file system directory structure partitions. For example, partitions A, B and C of a data store (e.g., a column data source) may reside in different directories of a file system. In addition to different directories, the data store may be distributed across a plurality of data servers (physical or virtual) such that the data is partitioned to a given server and within that server, the data may be sub-partitioned to one or more directories, and within each directory, the data may be further partitioned into one or more sub-directories and/or one or more files.

Partitioning the data using a file system provides an advantage in that the location keys and retrieval instructions for storage locations of interest for potential query result data can be discovered by means of traversing a directory structure, rather than a separately-maintained location key and location retrieval information discovery service. Once discovered, locations can be narrowed from the full set of locations to a sub-set according to query instructions, which can help speed up query operations by permitting the data system to defer accessing actual data ("lazy loading") and begin to narrow down the set of rows to evaluate without handling data (e.g., in memory and/or transmitting via a communication network). This is further enhanced by support in the data system's query engine for partitioning columns—columns of the data that are a property of all rows in any location retrieved from a given partition of the location key space, typically embodied in the name of a sub-directory when a file system is used in this way. Certain query operations can thus be executed in whole or in part against location key fields on a per-partition basis rather than against column data on a per-row basis. This may greatly improve execution performance by decreasing the input size of the calculations by several orders of magnitude.

Within a partition, data may be grouped according to a column value. The grouping may have one or more levels, with a multi-level grouping having a logical hierarchy based on the values of two or more columns, such that groups in "higher-level" columns fully-enclose groups in "lower-level" columns. Further, within a partition or group, the data can be ordered according to a given ordering scheme, e.g. strictly by the real-time recording order, or according to some sorting criteria. Grouping in this way can enhance query performance by allowing for very simple, high performance data indexing, and by increasing the physical locality of related data, which in turn can reduce the number of rows or blocks that must be evaluated, and/or allow for extremely performant data caching and pre-fetching, with high cache hit ratios achieved with smaller cache sizes than some other data systems.

For example, securities trading data may be partitioned across servers by a formula that takes ticker symbol as input. Within each server, the data may be partitioned by a directory corresponding to trade data date. Within each date partition directory, data may be in a file grouped by one or more ticker symbol values. Within each ticker symbol group, the data may be ordered by time.

In another example, when generating a query result table, the data system can first focus on a server (or servers) for the symbol (or symbols) being accessed, then one or more partitions for the date(s) of interest, then one or more files and group(s) within the file(s) before any data is actually accessed or moved. Once the data system resolves the actual data responsive to the query, the data (or references to the data in one or more data sources) can be retrieved and stored into a query result table according to a strict ordering and will be evaluated and returned in that same order each time the query is executed.

It will be appreciated that some data stores or tables can include data that may be partitioned, grouped, and/or ordered. For example, some data may be partitioned and ordered, but not grouped (e.g., periodic data such as intraday trading data). Other data may be partitioned, grouped and ordered (e.g., long-term storage data such as historical trading data). Also it will be appreciated that any individual table, partition or group can be ordered. Partitions can be grouped according to a grouping and/or ordering specific to each partition.

Figure 4:
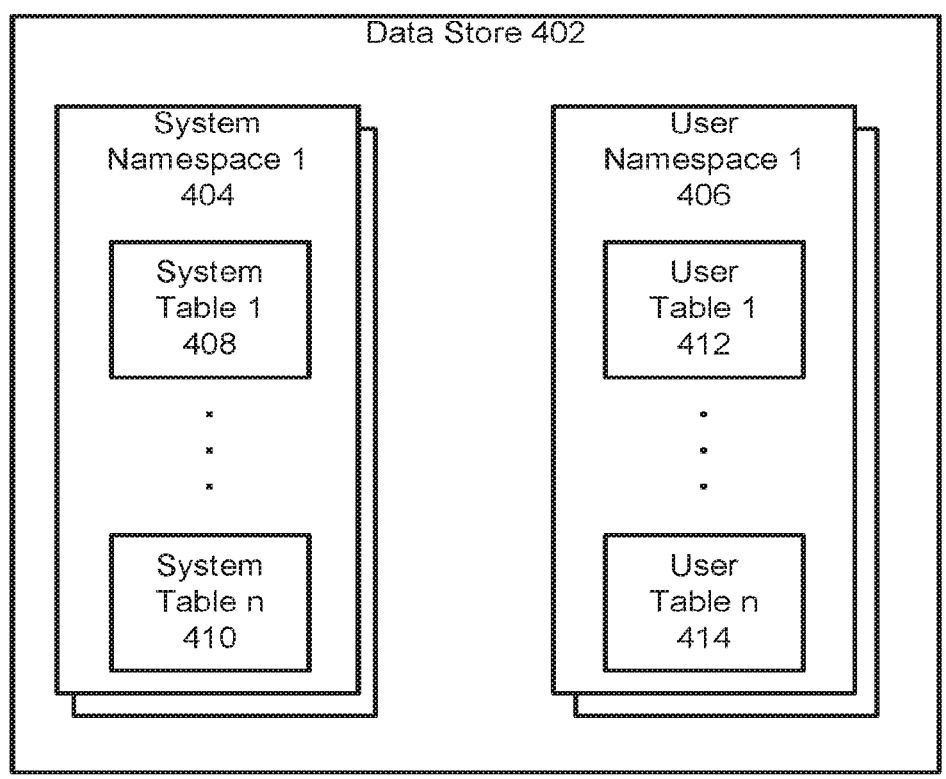
FIG. 4 is a diagram of an example data system namespace arrangement in accordance with some implementations.

FIG. 4 is a diagram of an example data store 402 showing an example namespace arrangement in accordance with some implementations. The data store 402 includes one or more system namespaces 404 and one or more user namespaces 406. A namespace (404, 406) can include directory names, file names, partition names, table names, etc. The system namespace 404 can be used for one or more system tables (408-410). System tables may include tables that may not be modified by a data system user (e.g., intraday securities trading data and historical securities trading data). The user namespace 406 can be used for one or more user tables (412-414) that may be modified by a user. A data source or data object can be referenced in the data system via a combination of namespace and data object name.

A data object (such as a table) within the computer data system can include a definition that provides information used to access and/or modify the data object. The data object definition information can include a namespace, a data object name (e.g., a table name), and an ordered list of column definitions. Each column definition can include one or more of a column name, a column type (e.g., partitioning, grouping, normal, etc.), data type, component type (for arrays), and storage hint information for columns having variable sized or encoded data.

Figure 5A:
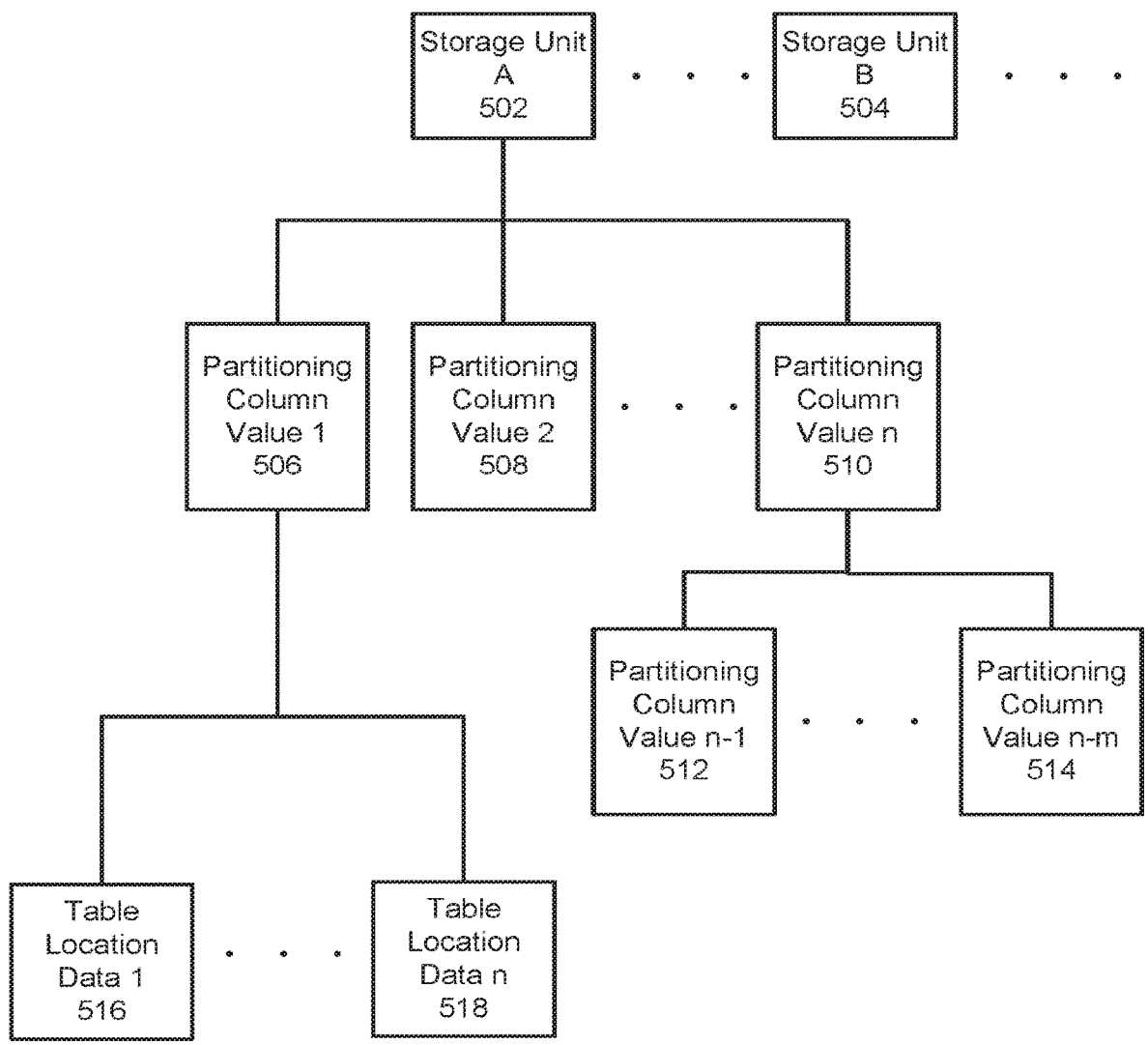
FIGS. 5A and 5B are diagrams of an example data object storage configurations in accordance with some implementations.

FIG. 5A is a diagram of an example data storage configuration 500 for a computer data system in accordance with some implementations. In particular, the data storage configuration 500 is a hierarchical file system-based configuration having one or more storage units (502, 504), which are themselves partitions of the data for administrative purposes, with each storage unit having zero or more column partitions identified by partitioning column values (506-510). A namespace can be used as a "starting point" for evaluation of a formula that accesses data stored in the computer data system. A column partition can have one or more sub-layers (512, 514). A partitioning column value can include a value such as a date (e.g., Partitioning Column Value 1 could be "2016-05-01", Partitioning Column Value 2 could be "2016-05-05", etc.).

Each column partition (the data stored under a given partition column value-named directory) (e.g., 506-510) can include zero or more table locations (516, 518). The table location data is identified by a table location key comprised of the partition identifiers that are used to find the location, in this case a storage unit identifier and a partitioning column value. For example, table location data 1 516 could have a table location key of "A/2016-05-01", which can refer to storage unit "A" and the partitioning column value of the date "2016-05-01." While a tree structure is shown in FIG. 5A as an example implementation for illustration purposes, it will be appreciated that other structure or approaches can be used. A location can be a leaf node in a partition tree (or hierarchy) of location keys.

Figure 5B:
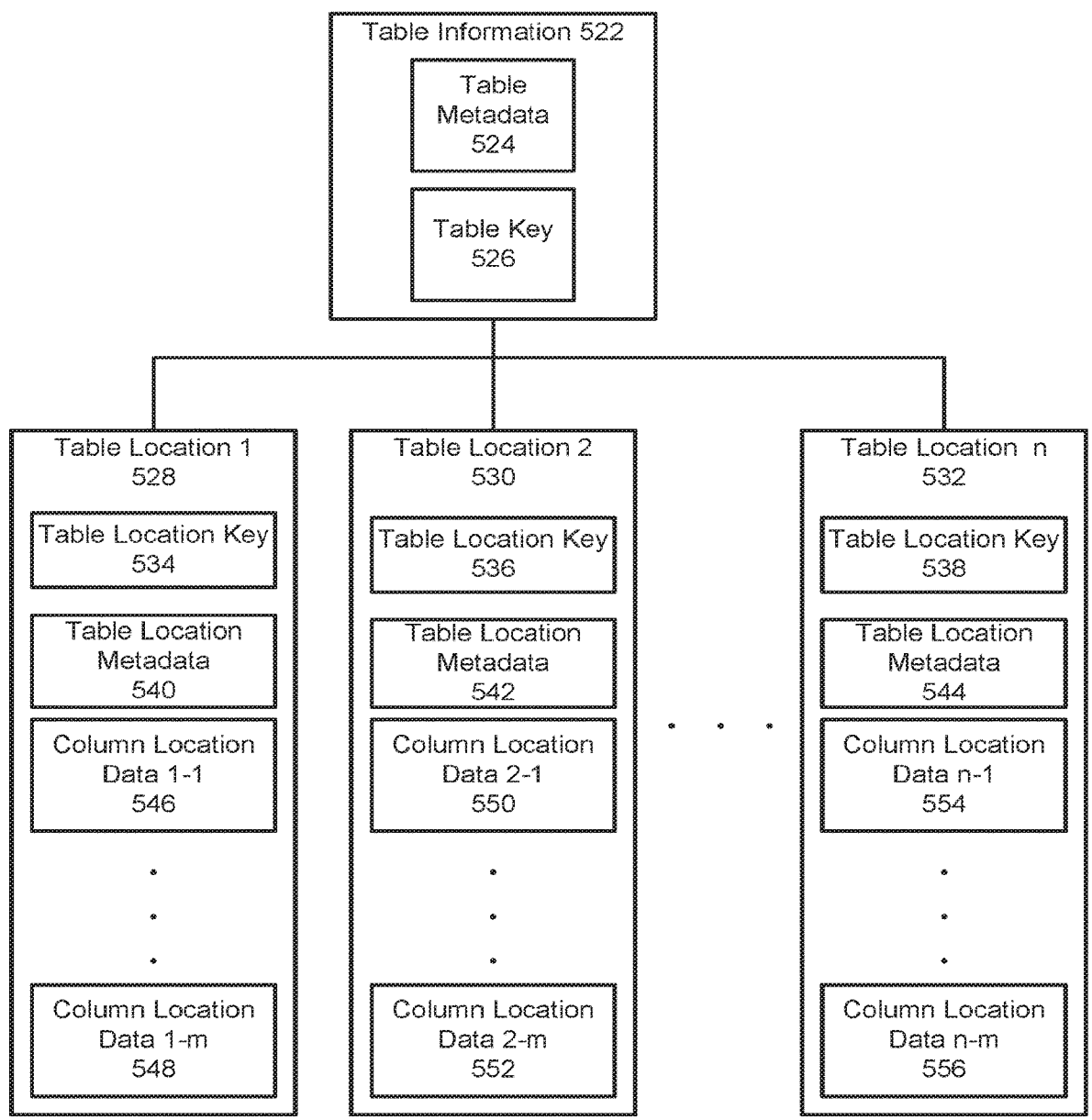

FIG. 5B is a diagram of an example table 520 composed in part of table location data (e.g., 516 or 518). The table 520 includes table-level information such as table metadata 524 and table key information 526. The table metadata 524 can include column name(s), data type(s), special properties (e.g., grouping, partitioning, etc.) and storage information. The table key 526 can include the table namespace, table name, and table type (e.g., system, user, etc.), or other appropriate identifiers meaningful to the user.

The table 520 can include one or more locations (528-532). Each table location (528-532) can include table location key information (e.g., 534-538, respectively) and table location metadata (540-544, respectively). Each table location (528-532) can also include column location data (546-548, 550-552, and 554-556, respectively). In some implementations, a column location is a table location's information for the ordered values that belong to a column such as column location metadata (grouping index info, for example) and column location data. Column data can include the data that the column location presents.

The table location key (e.g., 534-538 can include storage information (path, address, etc.), and partitioning column value(s) (e.g., date). The table location metadata (e.g., 540-544) can include table location size, modification time, etc.).

Column location data (e.g., 546-556) can be represented by one or more files with per position (e.g., row number in this table location) access at the outermost level.

Figure 6:
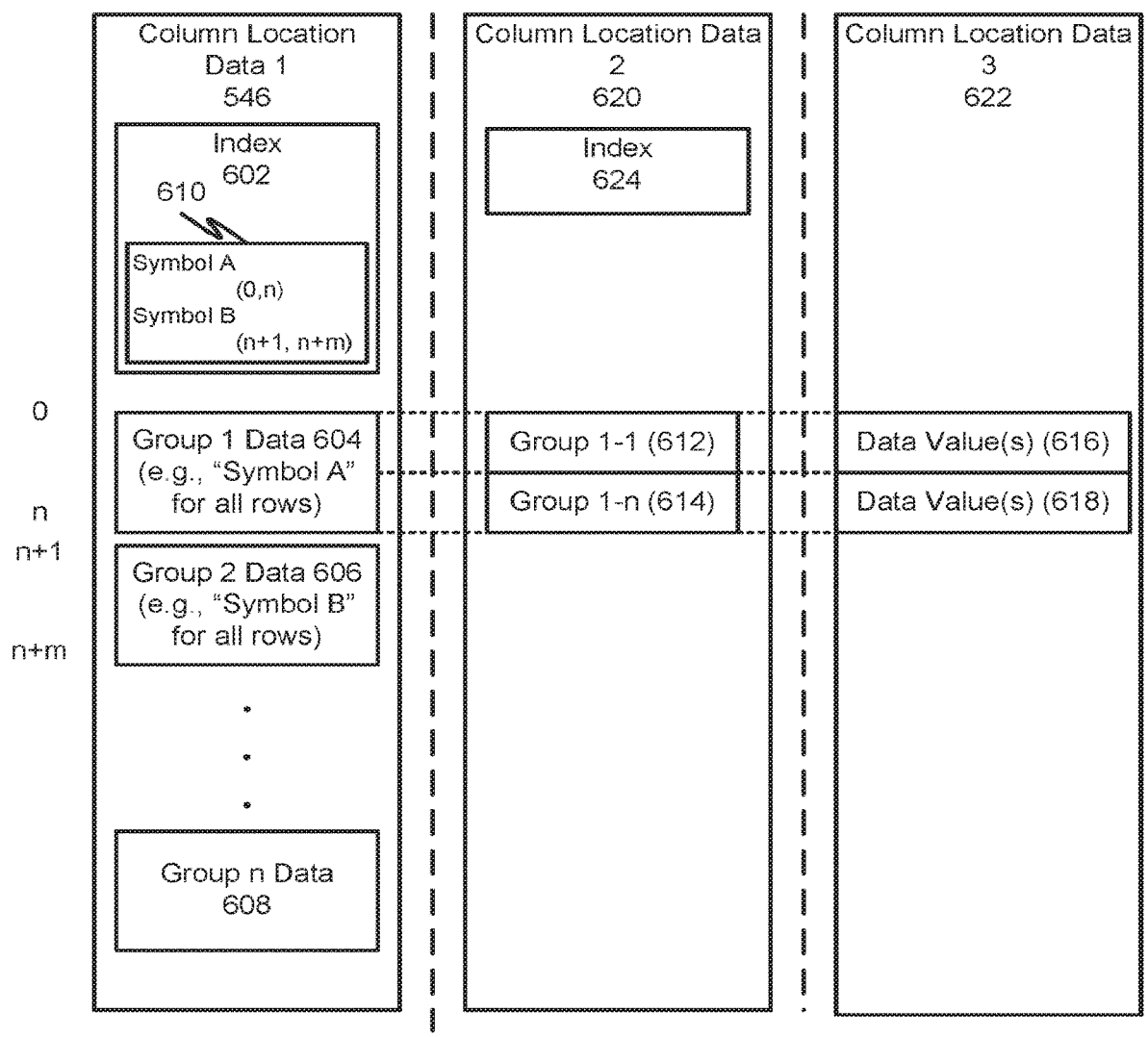
FIG. 6 is a diagram showing details of an example data partition in accordance with some implementations.

Details of a grouped column (e.g., 546) are shown in FIG. 6. The grouped column 546 includes an index 602 for the column and a plurality of coarse data groups 604-608 within a column ("Column 1"), fine data groups 612-612 (in "Column 2" 620) and normal (e.g., ungrouped) data 616-618 in "Column 3" 622. The grouped column index 602 includes value and range information 610 for the grouped column. The combination of grouping and ordering can help provide efficient data operations. For example, if a grouped and ordered column contains price information over time, a rate of change of price is computable within the grouping and ordering without additional computation (e.g., sorting, etc.). Column 620 can also have an index 624 that defines the grouping (e.g., with value and range information) within that column similar to index 602 for column 546.

Figure 7:
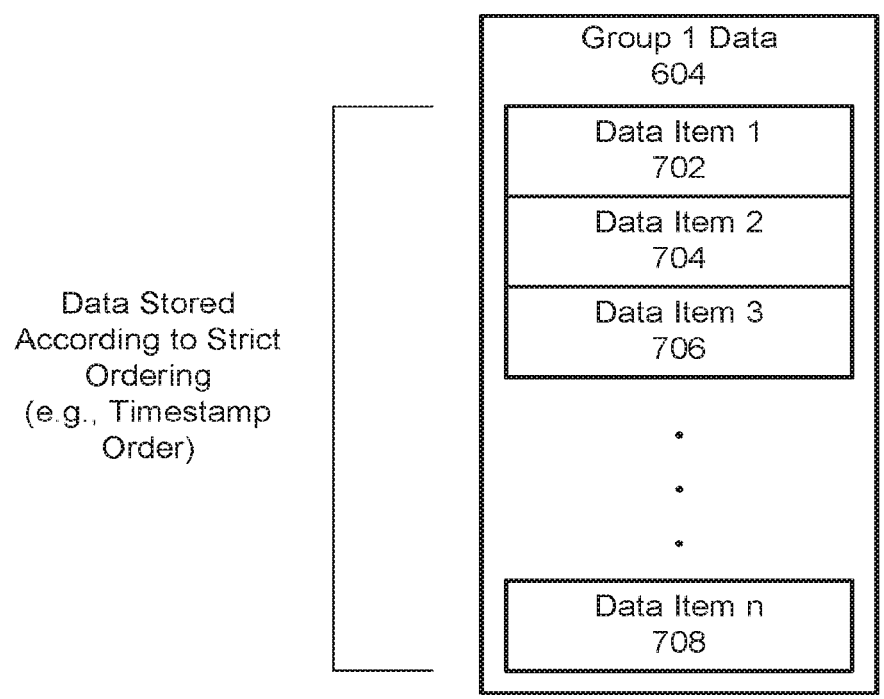
FIG. 7 is a diagram of an example set of grouped data in accordance with some implementations.

Details of an example group of data (e.g., 604) are shown in FIG. 7. A group of data 604 can include one or more data items 702-708. The grouped data can also be ordered according to a strict ordering.

Figure 8:
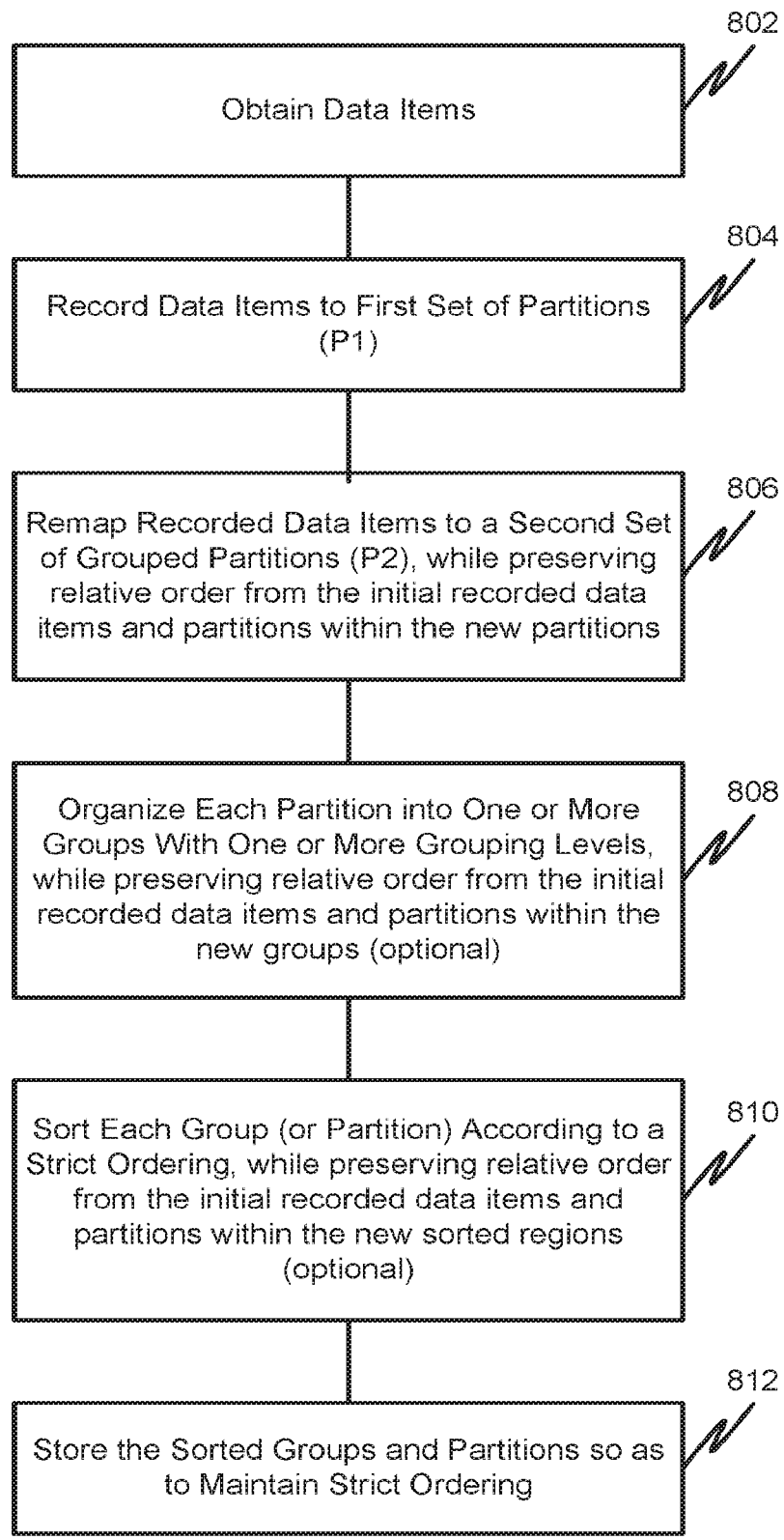
FIG. 8 is a flowchart of an example method for storing data in an ordered, partitioned data system in accordance with some implementations.

FIG. 8 is a flowchart of an example method 800 for storing data in a partitioned, grouped, and/or ordered data system in accordance with some implementations. Processing begins at 802, where one or more data items are obtained. Each data item can include an individual variable or field, a data structure having one or more information items (e.g., a data record having multiple fields), or an object comprising variables, functions and/or data structures. An individual variable or field can include a byte (e.g., an 8 bit value), a short (e.g., an 16 bit value), an int (e.g., an 32 bit value), a long (e.g., a 64 bit value), a float (e.g., a single-precision 32-bit IEEE 754 floating point), a double (e.g., a double-precision 64-bit IEEE 754 floating point), a Boolean (e.g., 1 bit), a character (e.g., a 16 bit Unicode character), or a string (one or more characters). Any data field can also include a null value defined for the specific type of that data field. Some implementations can also include support for arbitrary objects (e.g., blobs) to be stored. Support for arbitrary objects can be included as part of the support for one or more of the other types mentioned above.

The data item(s) can be obtained by receiving input from another system, by receiving input from a process running within the same system, by requesting data from an internal or external process, or the like. Processing continues to 804.

At 804, the data items are recorded to a first set of partitions (P1). The initial recording to the first partition may be performed without grouping or ordering in order to maintain performance. For example, if the first partition is configured for storing periodic data (e.g., intraday trading data) that may be needed for real-time or near real-time processing, the data may be stored in the order received without grouping or ordering in order to facilitate making the data available to other processes with lower-latency, at the cost of additional data transfer and/or computation at data consuming processes (e.g., remote query processors). Processing continues to 806.

At 806, data from P1 is remapped into a second set of grouped partitions (P2), while preserving relative order from the initial recorded data items and partitions within the new partitions. The remapping process may be part of a conversion process to take periodic data and prepare it for long-term storage. Processing continues to 808.

At 808, each partition is optionally grouped into one or more groups each having one or more grouping levels, while preserving relative order from the initial recorded data items and partitions within the new groups. The grouping can be performed based on one or more data columns. The grouping process can provide improved disk access times in view of the tendency for related data to be accessed together. Processing continues to 810.

At 810, each group and/or partition is optionally sorted according to a strict ordering, while preserving relative order from the initial recorded data items and partitions within the sorted regions. The ordering can be specified by the table metadata 504 or grouping column metadata 602. The strict ordering can help provide performance benefits as discussed above. Processing continues to 812.

At 812, the sorted groups and partitions are stored to a storage (e.g., physical storage) so as to maintain the strict order. This can provide an advantage of permitting the data system to access the partitions in a deterministic order and provide results in a guaranteed, repeatable ordering.

In general, when generating a result table in response to a query, the result table can go through a lifecycle that can help ensure that a minimal amount of data is loaded. For example, as a filtering operation is executed and generates a result table for the filtering operation, the result table goes from an abstract structure having partition and schema information to a fully realized result table backed by actual data.

The lifecycle can include 1) identifying container and schema metadata, 2) identifying data locations within the container and schema, and 3) identifying one or more columns including locations and index values for the data backing the result table. An example workflow for this can include executing a given query (e.g., for intraday and/or historical securities trading data). Next, a list of locations of potential result data is assembled, where the locations are mapped in an index space having a preserved ordering. This table can now handle queries and can use "lazy data loading" or loading data only when it is necessary to provide as a result. By utilizing lazy data loading the data system provides opportunities for optimization in terms of how much data is loaded (or moved across a network) and when that data is loaded (or moved). Also, by deferring data loading as late as possible, the query operation may filter or otherwise exclude data that might otherwise have been loaded using conventional techniques.

Figure 9:
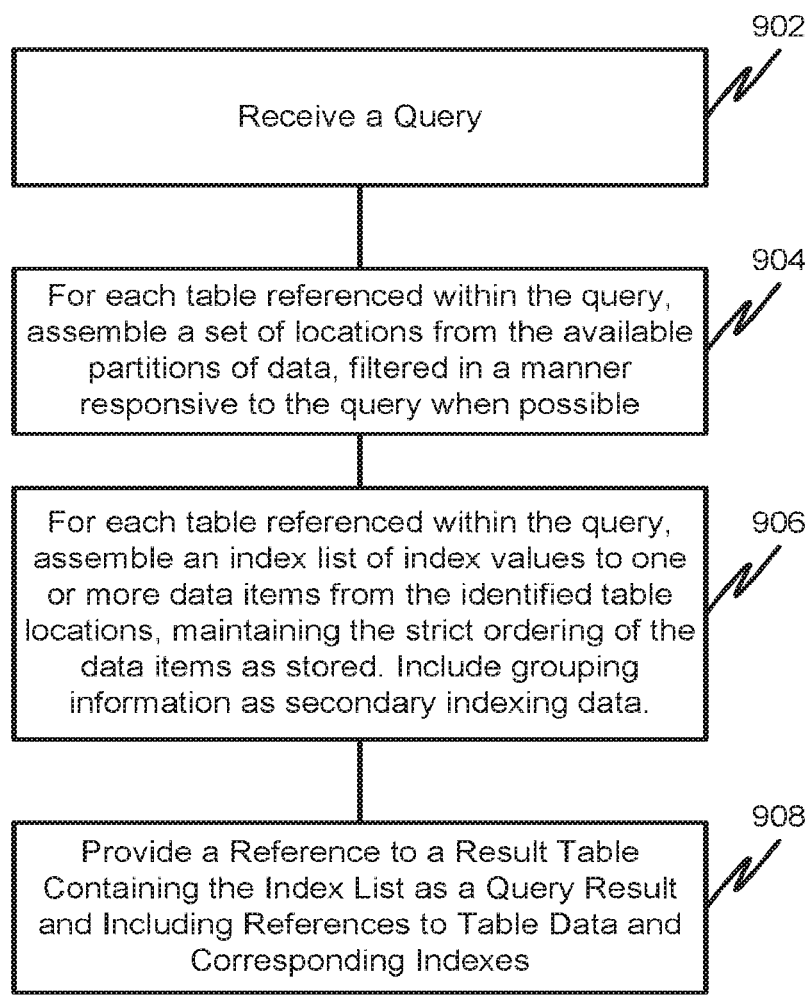
FIG. 9 is a flowchart of an example method for retrieving data from an ordered, partitioned data system in accordance with some implementations.

FIG. 9 is a flowchart of an example method 900 for retrieving data from a partitioned, grouped, and/or ordered data system in accordance with some implementations. Processing begins at 902, where a data system query is received (e.g., an electronic message containing a data system query is received at a remote query processor within a query host machine from a client computer system). Processing continues to 904.

At 904, for each table referenced within the query, a set of locations is assembled from the available partitions of data, filtered in a manner responsive to the query when possible. Processing continues to 906.

At 906, for each table referenced within the query, assemble an index list of index values to one or more data items from the identified table locations, maintaining the strict ordering of the data items as stored. Include grouping information as secondary indexing data. Processing continues to 908.

At 908, a result data object (e.g., table) is generated that contains the index list as a query result and including references to data object data and corresponding indexes into data sources. This result data object can be an intermediate query result. A subsequent query result can be generated that includes references to specific data.

Figure 10:
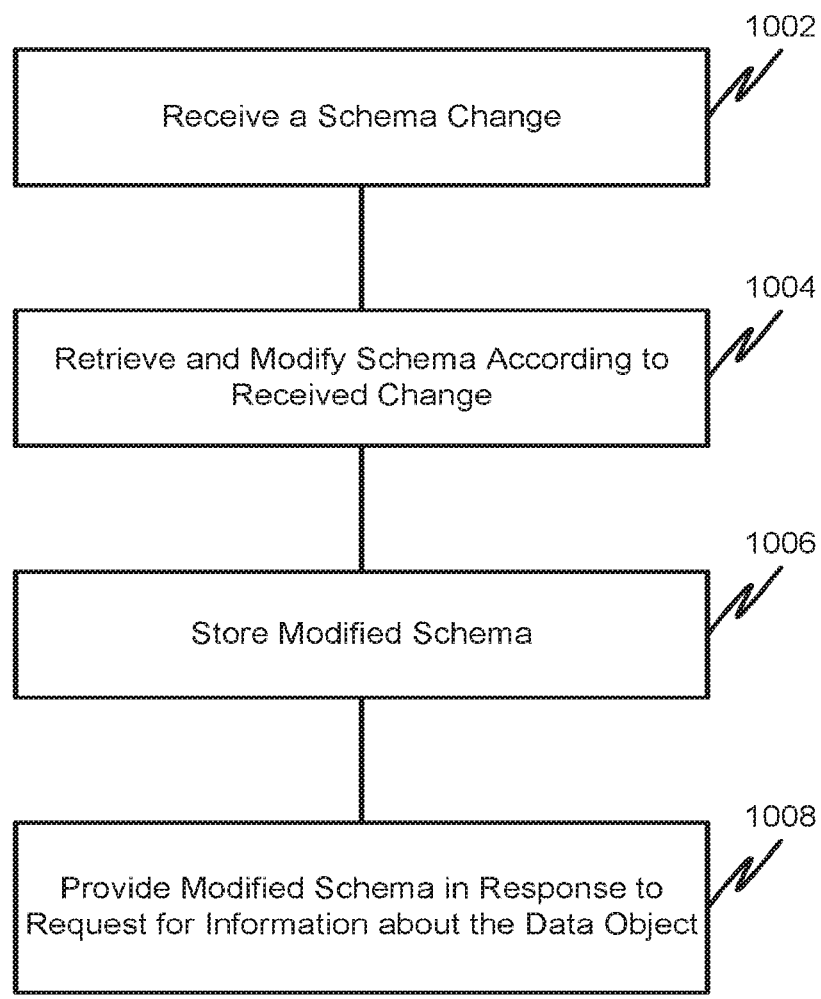
FIG. 10 is a flowchart of an example method for data object schema modification in accordance with some implementations.

FIG. 10 is a flowchart of an example method 1000 for data object schema modification. Processing begins at 1002, where a schema change for a given data object is received. The schema change can be generated via a command line interface, programmatically, and/or through a query language construct being executed by a query language processor. The schema change can include adding a column to a data object, removing a column from a data object or making other changes to the data object. Processing continues to 1004.

At 1004, the schema of the given data object is retrieved and modified according to the type of change received. For example, the schema could be modified to include reference to a new column for a table data object without having to access any of the table data or modify the existing columns or rows of the table. In another example, the schema could be modified to remove a column from a table. The column can be removed without having to access any table data or modify any other columns or rows of the table. This provides an advantage or permitting an O(1) schema modification, which can be a significant advantage in tables having a large number of columns and in tables with columns having a large number of rows (e.g., millions of rows, billions of rows or more). Processing continues to 1006.

At 1006, the modified schema is stored in the appropriate location corresponding to the data object. The data and computational resources needed for retrieving, modifying and then storing the modified schema are minimal compared to some conventional database schema modification processes which may require accessing and manipulating rows or columns of data in the database to perform a schema modification. Processing continues to 1008.

At 1008, the modified schema is provided in response to requests for information about the data object the modified schema is associated with.

Figure 11:
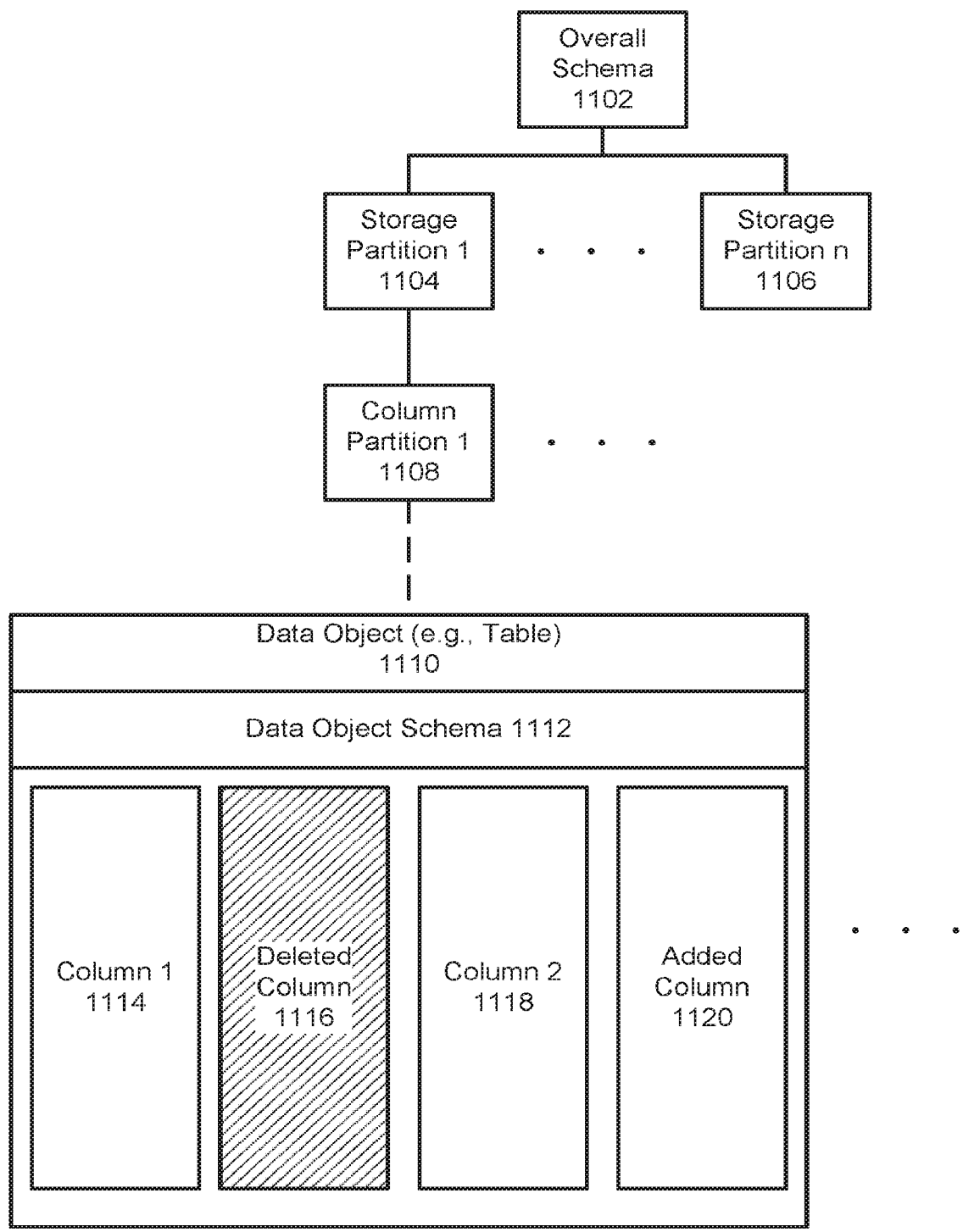
FIG. 11 is a diagram of an example modified schema in accordance with some implementations.

FIG. 11 shows a diagram of an example data system implementation 1100. The schema implementation schema implementation 1100 includes an overall schema 1102, a plurality of storage partitions (1104, 1106), a column partition 1108 and a data object 1110 (e.g., a table). The data object 1110 includes a data object schema 1112, a first column 1114, a deleted column 1116, a second column 1118 and an added column 1120. A partitioning column value (as discussed above) can refer to a column partition. For example, a column partition (e.g., 1108) is not a partition of a column, but rather a partition that can be identified by a single column's value, and may include one or more table locations.

In operation, the data object schema 1112 can be modified as discussed above to remove a column (e.g., 1116) or to add a column (e.g., 1120). The data object schema 1112 can be represented in any suitable format, such as extensible markup language (XML) or the like. In addition to being able to modify a data object via its associated schema (e.g., 1112), the overall schema can also be modified to change partitioning or other attributes associated with the overall schema.

Data object schemas may be modified by processes or users having permission to modify the schema of the data object. Overall schemas may be modified by user or process (typically administrator level users or processes) having permission to modify the overall schema.

Data object metadata can also include validity information indicating whether data in the data object has been tested (or validated). A query can use the validity data as a parameter for results. For example, the query may only use valid data for providing results.

The data object 110 can be thought of as a leaf node in the schema/partition tree structure shown in FIG. 11. A logical data object or table can include more or less columns than the leaf node. When a column is added, null values may be imputed implicitly to the leaf node or, if data is available, it can be added to data object.

It will be appreciated that a request to modify a schema can include a request to modify a data type of a column within a data object (e.g., table), and the modified schema information includes a modified data type for that column based on the request. Thus, the data type of a column can be changed through modification of only the schema information contained in the table (or column location) metadata. without handling the data of that column. Changing data type to a wider data type (e.g., from int to long) may be accomplished through schema data modification. Also, applying a data type change to a column may be conditionally carried out based on the existing type of the column.

In some implementations, a request to modify the schema can include a request to add a formula column (e.g., average of column A and Column B values) to the data object. A definition of the formula column can be added to the schema information and the formula column may not contain stored data. When data is requested from the formula column, the computer data system computes a response result to the request (e.g., "on the fly") for data from the formula column based on one or more data columns referenced by the formula column and returns that result. In other implementations, the formula column may only contain data in a partial number of the rows in the table. In this instance, the computer data system computes a response result to the request for data from the formula column based on stored data in the formula column for rows where data is present and, for rows where data is not present, computes a response result (e.g., "on the fly") to the request for data from the formula column based on one or more data columns referenced by the formula column and returns that result.

It will be appreciated that the modules, processes, systems, and sections described above can be implemented in hardware, hardware programmed by software, software instructions stored on a nontransitory computer readable medium or a combination of the above. A system as described above, for example, can include a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC), a field programmable gate array (FPGA), graphics processing unit (GPU) or the like. The instructions can be compiled from source code instructions provided in accordance with a programming language such as Java, C, C++, C#.net, assembly or the like. The instructions can also comprise code and data objects provided in accordance with, for example, the Visual Basic™ language, a specialized database query language, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their subcomponents or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) can be implemented in software executed on a programmed general purpose computer, a special purpose computer, a microprocessor, or the like.

It is, therefore, apparent that there is provided, in accordance with the various embodiments disclosed herein, methods, systems and computer readable media for data partitioning and ordering.

Application Ser. No. 15/154,974, entitled "DATA PARTITIONING AND ORDERING" and filed in the United States Patent and Trademark Office on May 14, 2016, is hereby incorporated by reference herein in its entirety as if fully set forth herein.

Application Ser. No. 15/154,975, entitled "COMPUTER DATA SYSTEM DATA SOURCE REFRESHING USING AN UPDATE PROPAGATION GRAPH" and filed in the United States Patent and Trademark Office on May 14, 2016, is hereby incorporated by reference herein in its entirety as if fully set forth herein.

Application Ser. No. 15/154,979, entitled "COMPUTER DATA SYSTEM POSITION-INDEX MAPPING" and filed in the United States Patent and Trademark Office on May 14, 2016, is hereby incorporated by reference herein in its entirety as if fully set forth herein.

Application Ser. No. 15/154,980, entitled "SYSTEM PERFORMANCE LOGGING OF COMPLEX REMOTE QUERY PROCESSOR QUERY OPERATIONS" and filed in the United States Patent and Trademark Office on May 14, 2016, is hereby incorporated by reference herein in its entirety as if fully set forth herein.

Application Ser. No. 15/154,983, entitled "DISTRIBUTED AND OPTIMIZED GARBAGE COLLECTION OF REMOTE AND EXPORTED TABLE HANDLE LINKS TO UPDATE PROPAGATION GRAPH NODES" and filed in the United States Patent and Trademark Office on May 14, 2016, is hereby incorporated by reference herein in its entirety as if fully set forth herein.

Application Ser. No. 15/154,984, entitled "COMPUTER DATA SYSTEM CURRENT ROW POSITION QUERY LANGUAGE CONSTRUCT AND ARRAY PROCESSING QUERY LANGUAGE CONSTRUCTS" and filed in the United States Patent and Trademark Office on May 14, 2016, is hereby incorporated by reference herein in its entirety as if fully set forth herein.

Application Ser. No. 15/154,985, entitled "PARSING AND COMPILING DATA SYSTEM QUERIES" and filed in the United States Patent and Trademark Office on May 14, 2016, is hereby incorporated by reference herein in its entirety as if fully set forth herein.

Application Ser. No. 15/154,987, entitled "DYNAMIC FILTER PROCESSING" and filed in the United States Patent and Trademark Office on May 14, 2016, is hereby incorporated by reference herein in its entirety as if fully set forth herein.

Application Ser. No. 15/154,988, entitled "DYNAMIC JOIN PROCESSING USING REAL-TIME MERGED NOTIFICATION LISTENER" and filed in the United States Patent and Trademark Office on May 14, 2016, is hereby incorporated by reference herein in its entirety as if fully set forth herein.

Application Ser. No. 15/154,990, entitled "DYNAMIC TABLE INDEX MAPPING" and filed in the United States Patent and Trademark Office on May 14, 2016, is hereby incorporated by reference herein in its entirety as if fully set forth herein.

Application Ser. No. 15/154,991, entitled "QUERY TASK PROCESSING BASED ON MEMORY ALLOCATION AND PERFORMANCE CRITERIA" and filed in the United States Patent and Trademark Office on May 14, 2016, is hereby incorporated by reference herein in its entirety as if fully set forth herein.

Application Ser. No. 15/154,993, entitled "A MEMORY-EFFICIENT COMPUTER SYSTEM FOR DYNAMIC UPDATING OF JOIN PROCESSING" and filed in the United States Patent and Trademark Office on May 14, 2016, is hereby incorporated by reference herein in its entirety as if fully set forth herein.

Application Ser. No. 15/154,995, entitled "QUERY DISPATCH AND EXECUTION ARCHITECTURE" and filed in the United States Patent and Trademark Office on May 14, 2016, is hereby incorporated by reference herein in its entirety as if fully set forth herein.

Application Ser. No. 15/154,996, entitled "COMPUTER DATA DISTRIBUTION ARCHITECTURE" and filed in the United States Patent and Trademark Office on May 14, 2016, is hereby incorporated by reference herein in its entirety as if fully set forth herein.

Application Ser. No. 15/154,997, entitled "DYNAMIC UPDATING OF QUERY RESULT DISPLAYS" and filed in the United States Patent and Trademark Office on May 14, 2016, is hereby incorporated by reference herein in its entirety as if fully set forth herein.

Application Ser. No. 15/154,998, entitled "DYNAMIC CODE LOADING" and filed in the United States Patent and Trademark Office on May 14, 2016, is hereby incorporated by reference herein in its entirety as if fully set forth herein.

Application Ser. No. 15/154,999, entitled "IMPORTATION, PRESENTATION, AND PERSISTENT STORAGE OF DATA" and filed in the United States Patent and Trademark Office on May 14, 2016, is hereby incorporated by reference herein in its entirety as if fully set forth herein.

Application Ser. No. 15/155,001, entitled "COMPUTER DATA DISTRIBUTION ARCHITECTURE" and filed in the United States Patent and Trademark Office on May 14, 2016, is hereby incorporated by reference herein in its entirety as if fully set forth herein.

Application Ser. No. 15/155,005, entitled "PERSISTENT QUERY DISPATCH AND EXECUTION ARCHITECTURE" and filed in the United States Patent and Trademark Office on May 14, 2016, is hereby incorporated by reference herein in its entirety as if fully set forth herein.

Application Ser. No. 15/155,006, entitled "SINGLE INPUT GRAPHICAL USER INTERFACE CONTROL ELEMENT AND METHOD" and filed in the United States Patent and Trademark Office on May 14, 2016, is hereby incorporated by reference herein in its entirety as if fully set forth herein.

Application Ser. No. 15/155,007, entitled "GRAPHICAL USER INTERFACE DISPLAY EFFECTS FOR A COMPUTER DISPLAY SCREEN" and filed in the United States Patent and Trademark Office on May 14, 2016, is hereby incorporated by reference herein in its entirety as if fully set forth herein.

Application Ser. No. 15/155,009, entitled "COMPUTER ASSISTED COMPLETION OF HYPERLINK COMMAND SEGMENTS" and filed in the United States Patent and Trademark Office on May 14, 2016, is hereby incorporated by reference herein in its entirety as if fully set forth herein.

Application Ser. No. 15/155,010, entitled "HISTORICAL DATA REPLAY UTILIZING A COMPUTER SYSTEM" and filed in the United States Patent and Trademark Office on May 14, 2016, is hereby incorporated by reference herein in its entirety as if fully set forth herein.

Application Ser. No. 15/155,011, entitled "DATA STORE ACCESS PERMISSION SYSTEM WITH INTERLEAVED APPLICATION OF DEFERRED ACCESS CONTROL FILTERS" and filed in the United States Patent and Trademark Office on May 14, 2016, is hereby incorporated by reference herein in its entirety as if fully set forth herein.

Application Ser. No. 15/155,012, entitled "REMOTE DATA OBJECT PUBLISHING/SUBSCRIBING SYSTEM HAVING A MULTICAST KEY-VALUE PROTOCOL" and filed in the United States Patent and Trademark Office on May 14, 2016, is hereby incorporated by reference herein in its entirety as if fully set forth herein.

While the disclosed subject matter has been described in conjunction with a number of embodiments, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter.

What is claimed is:

1. A system for storing ordered data, the system comprising:
   one or more processors;
   computer readable storage coupled to the one or more processors, the computer readable storage having stored thereon instructions that, when executed by the one or more processors, cause the one or more processors to perform operations including:
   receiving an electronic message containing one or more data items;
   storing the received data items to a first set of one or more first partitions as first stored data in a first electronic data storage device, wherein each of the first set of partitions is not grouped;
   remapping the data items stored in the first set of partitions to a second set of one or more second partitions in a second electronic data storage device, each of the second partitions having a respective grouping, wherein each second partition of the second set of partitions corresponds to a directory in a file system, and wherein location keys and retrieval instructions for storage locations of interest for potential query result data are discovered by traversing a directory structure, wherein the location keys each include a partition identifier having a storage unit identifier and a partitioning column value;

storing the remapped first stored data as second stored data in the second set of partitions in the second electronic data storage device according to the respective grouping;

sorting each second partition of the second set of partitions according to a strict ordering to generate ordered second partitions;

organizing a partition of the ordered second partitions into two or more groups having one or more grouping levels based on one or more column values;

storing the ordered second partitions in the second electronic data storage device so as to maintain the strict ordering;

permitting the computer data system to defer accessing data by narrowing from a full set of locations to a sub-set of locations according to a query, and narrowing a set of rows to a sub-set of rows to evaluate prior to handling data; and executing query operations against the sub-set of locations on a per-partition basis based on the sub-set of locations and the sub-set of rows.

2. The system of claim 1,
wherein the organizing includes generating grouping metadata associated with the respective ordered second partition.

3. The system of claim 1, wherein the first electronic data storage device and the second electronic data storage device are different from each other.

4. The system of claim 1, wherein the second partitions are arranged according to an overall schema and the ordered partitions are arranged according to a partition schema associated with each respective ordered partition.

5. The system of claim 1, wherein the organizing includes organizing each partition of the ordered second partitions into two or more groups having one or more grouping levels based on one or more column values.

6. The method of claim 5, wherein the organizing includes generating grouping metadata associated with each respective ordered second partition.

* * * * *